United States Patent
Beckert

(10) Patent No.: US 8,589,495 B1
(45) Date of Patent: Nov. 19, 2013

(54) CONTEXT-BASED NOTIFICATION DELIVERY

(75) Inventor: Joerg Beckert, Mountain View, WA (US)

(73) Assignee: Adobe Systems Incorporated, San Jose, CA (US)

( * ) Notice: Subject to any disclaimer, the term of this patent is extended or adjusted under 35 U.S.C. 154(b) by 433 days.

(21) Appl. No.: 12/416,409

(22) Filed: Apr. 1, 2009

Related U.S. Application Data

(60) Provisional application No. 61/144,305, filed on Jan. 13, 2009.

(51) Int. Cl.
*G06F 15/16* (2006.01)

(52) U.S. Cl.
USPC .......................... 709/206; 709/204; 709/205

(58) Field of Classification Search
USPC .......................................... 709/204, 205, 206
See application file for complete search history.

(56) References Cited

U.S. PATENT DOCUMENTS

| | | | |
|---|---|---|---|
| 4,870,579 | A | 9/1989 | Hey |
| 4,996,642 | A | 2/1991 | Hey |
| 6,377,793 | B1 | 4/2002 | Jenkins |
| 6,480,713 | B2 | 11/2002 | Jenkins |
| 6,681,107 | B2 | 1/2004 | Jenkins et al. |
| 6,701,459 | B2 | 3/2004 | Ramanathan et al. |
| 7,024,459 | B2 | 4/2006 | McNamara et al. |
| 7,155,477 | B2 | 12/2006 | Blair et al. |
| 7,259,666 | B1 | 8/2007 | Hermsmeyer et al. |
| 7,324,990 | B2 | 1/2008 | Jaschek et al. |
| 7,363,024 | B2 | 4/2008 | Jenkins |
| 7,509,304 | B1 * | 3/2009 | Pather et al. .......................... 1/1 |
| 7,630,986 | B1 * | 12/2009 | Herz et al. .............................. 1/1 |
| 7,636,424 | B1 | 12/2009 | Halikhedkar et al. |
| 2003/0046421 | A1 | 3/2003 | Horvitz et al. |
| 2004/0098399 | A1 | 5/2004 | Risberg et al. |
| 2004/0128355 | A1 | 7/2004 | Chao |
| 2005/0140519 | A1 | 6/2005 | Smith |
| 2005/0219061 | A1 | 10/2005 | Lai et al. |
| 2005/0273810 | A1 * | 12/2005 | Zimmerman et al. .......... 725/34 |
| 2006/0195533 | A1 | 8/2006 | Isozaki et al. |
| 2007/0011314 | A1 * | 1/2007 | Horvitz et al. ................ 709/224 |
| 2007/0124228 | A1 | 5/2007 | Elias et al. |
| 2007/0156656 | A1 | 7/2007 | Pather et al. |
| 2007/0198695 | A1 | 8/2007 | Engelmann et al. |
| 2007/0288932 | A1 * | 12/2007 | Horvitz et al. ................ 719/313 |

(Continued)

OTHER PUBLICATIONS

Non-Final Office Action in U.S. Appl. No. 12/250,912 mailed Sep. 2, 2010.

(Continued)

*Primary Examiner* — Umar Cheema
(74) *Attorney, Agent, or Firm* — Kilpatrick Townsend & Stockton LLP

(57) ABSTRACT

A notification relay service architecture can utilize one or more computing platforms that are configured to rely on a connectivity descriptor. The connectivity descriptor can express permissions of various users of the notification relay service to publish to and/or listen to notifications from one or more "exchange points." The notification relay service can receive notifications from publishers intended for various exchange points and push notifications at exchange points to users without need for the notification relay service components to manage or even understand the underlying relationship(s) between publishers and subscribers. Server-based and/or client-based evaluations of a client's current context can be used to control whether and how notifications are relayed to/from the client.

20 Claims, 8 Drawing Sheets

(56) References Cited

U.S. PATENT DOCUMENTS

| | | | |
|---|---|---|---|
| 2008/0162183 | A1 | 7/2008 | Sachanandani et al. |
| 2008/0222545 | A1 | 9/2008 | Lemay |
| 2009/0030936 | A1* | 1/2009 | Ordille et al. ............. 707/103 R |
| 2009/0176517 | A1 | 7/2009 | Christie et al. |
| 2009/0177617 | A1 | 7/2009 | Lee |
| 2009/0222527 | A1 | 9/2009 | Arconati et al. |
| 2009/0307715 | A1 | 12/2009 | Santamaria et al. |

OTHER PUBLICATIONS

Response to Non-Final Office Action in U.S. Appl. No. 12/250,912, filed Dec. 2, 2010.

Non-Final Office Action in U.S. Appl. No. 12/416,341 mailed Nov. 15, 2010.

U.S. Appl. No. 12/250,912, Office Action mailed Feb. 16, 2011, 22 Pages.

U.S. Appl. No. 12/416,341, Response to Office Action filed Feb. 15, 2011.

"Download Notifications," web page at http://www.microsoft.com/downloads/render.aspx?content=notification . . . , as available via the internet and printed on Apr. 20, 2008.

"Desktop Notifications (using libnotify) / ROX Desktop," web page at http://roscidus.com/desktop/node/336, as available on the internet and printed on Apr. 20, 2008.

"Google Alerts," web page at http:www.google.com/support/alerts/bin/static.py?page=faq.html&hl=en, as available on the internet and printed on Apr. 20, 2008.

"Growl—About," web page at http://growl.info/about.php, as available on the internet and printed on Apr. 20, 2008.

Xep-0060: Publish-Subscribe, available at http://xmpp.or/extensions/xep-0060.html (Last accessed Dec. 4, 2008).

U.S. Appl. No. 12/108,892, filed Apr. 24, 2008 (Shapiro).

U.S. Appl. No. 12/250,912, filed Oct. 14, 2008 (Shapiro).

U.S. Appl. No. 12/416,341, filed Apr. 1, 2009 (Beckert et al.).

Office Action dated Jul. 14, 2011 in U.S. Appl. No. 12/108,892.

Non Final Office Action in Related U.S. Appl. No. 12/250,912, dated Jan. 18, 2013, 27 pages.

Non Final Office Action in Related U.S. Appl. No. 12/416,341, dated Feb. 20, 2013, 30 pages.

* cited by examiner

CONTEXT-BASED NOTIFICATION DELIVERY

PRIORITY CLAIM

This application claims priority to U.S. Patent Application No. 61/144,305, filed Jan. 13, 2009, and entitled "Notification Delivery Architecture," which is incorporated by reference herein in its entirety.

CROSS-REFERENCE TO RELATED APPLICATION

This application is related to U.S. patent application Ser. No. 12/416,341, by Joerg Beckert, Chris Somme, and Kuan Kou, filed the same day as the present application, and entitled "Notification Delivery Architecture," which is incorporated by reference herein in its entirety.

TECHNICAL FIELD

Embodiments discussed herein relate generally to the field of data processing systems, particularly to systems and methods for delivering one or more notifications.

BACKGROUND

Many applications create notifications for a client in order to notify the client of an activity that may be of interest to a user or provide a message to the user. For example, some instant messaging (IM) programs running in the background of an operating environment output a notification to the user when a contact becomes available. Some email applications notify the client when a new email is received for the user. Some update programs output a notification to the client when updates to a program on the client are downloaded and are to be installed. In some cases, a user's computing system must execute a dedicated application, process, or component (a "notifier") for each publisher in order for the user to receive notifications sent by the publishers.

The proliferation of notifications can lead to problems, however. For instance, a graphical user interface (GUI) may become cluttered with multiple notifier icons outputting user notifications. Another possibility is that the requirement for direct contact between the client and multiple publishers to deliver notifications can reduce bandwidth availability and/or increase costs to the user and the publishers. Still further, a user must configure each and every notifier application—for example, to silence all notifier applications during a period of time so as not to be interrupted during a presentation.

SUMMARY

Embodiments discussed herein include methods and systems that provide an infrastructure for relaying notifications between publishers and subscribers. Users of a notification relay service may receive notifications from multiple different publishers using a single connection from a client to the notification relay service.

In some embodiments, the notification relay service is provided using one or more computing platforms that are configured to rely on a set of connection parameter data referred to below as a "connectivity descriptor." The connectivity descriptor can express permissions of various users of the notification relay service to publish to and/or listen to notifications from one or more "exchange points" (also referred to as publishing endpoints). Each exchange point can comprise a reference for publishing or listening to notifications via the notification relay system, which virtually connects clients to one another via one or more exchange points.

In some embodiments, a computer platform is used to provide a publish/subscribe ("pubsub") management component that implement business logic for managing the relationship between publishers and subscribers and produces/updates data to configure the connectivity descriptor to achieve the desired publishing behavior. The term "business logic" is used to refer to management of publishing and listening rights according to one or more delivery models.

However, the use of the connectivity descriptor allows publisher-subscriber relationship management tasks to be separated from delivery tasks. For instance, the notification relay service can receive notifications from clients intended for various exchange points and push notifications associated with exchange points to clients without need for the notification relay service components responsible for delivery to manage or even understand the underlying relationship(s) between publishers and subscribers of the notifications. Instead, relationship management and delivery can be varied independently. For instance, this may allow several different publisher-subscriber or other relationship management models to be supported using the same delivery infrastructure. As another example, a single relationship management model may be used alongside several different delivery models.

In some embodiments, the pubsub component may correlate exchange points to particular logical groupings for notifications (such as certain exchange points for notification feeds, topics, etc.), determine which clients are subscribed to streams, and allow those clients to listen to the streams. Delivery to the subscribed clients can be facilitated by configuring the connectivity descriptor to grant those clients listening rights to the corresponding exchange point(s).

As another example, the pubsub component may determine a client is an owner of a logical grouping (e.g., a feed author) and allow the client to publish to one or more corresponding exchange point(s) by setting publishing permissions in the connectivity descriptor. The pubsub component may allow the owner to specify which clients are (or are not) allowed to listen to the stream and set permissions for the exchange point(s) based on the owner's specifications.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
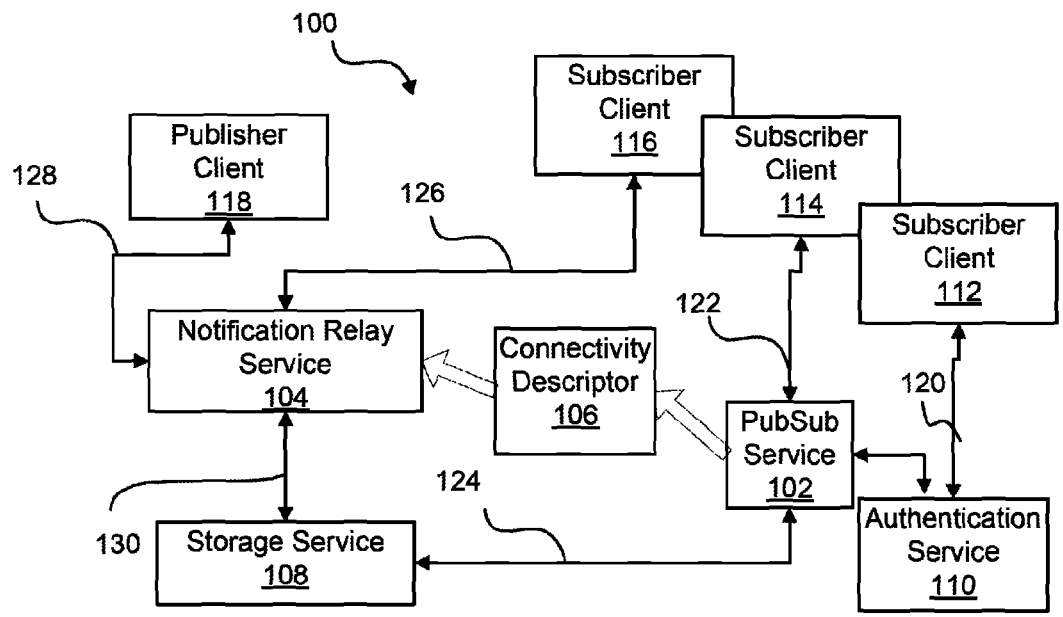
FIG. 1 is a block diagram illustrating an exemplary architecture for a notification delivery system.

FIG. 1 is a block diagram illustrating an exemplary architecture 100 for a system for relaying notifications provided by one or more publishers to one or more clients of the notification relay service. The clients each correspond to an application, component, process, or other software element that connects to the notification relay service to receive and/or send notifications. As used herein, a "publisher client" is a client of a notification relay service that provides content for consumption via the service and a "subscriber client" is a client of the notification relay service that consumes content. A client may be both a "publisher" and a "subscriber" in some instances. Although a client that consumes content is referred to as a "subscriber," this usage is not meant to imply that all clients who consume content must have an actual subscription or other relationship to the publisher.

One or more entities such as a person or organization may be associated with a client—for example, a social network service may utilize a publisher client to distribute notifications while an individual uses a subscriber client to view notifications from multiple different publishers. However, in some cases, a client may be only indirectly associated with an entity—for instance, a publisher client may correspond to a software process that reports the status of a component of an individual's computing platform.

Notifications can be sent for any purpose, including personal communication between individuals and/or organizations, data transfer to/from a device or program component, and/or mass communication between individuals/organizations. For example, notifications can include, but are not limited to, personal messages and updates, system messages, published content for consumption (e.g., blog postings, news articles, etc.), and advertisements.

Architecture 100 in FIG. 1 includes a publication/subscription (pubsub) management component 102 that is used to maintain data representing user roles as publishers and/or subscribers of various content provided via notifications. In some, but not all, implementations, pubsub component 102 also manages the roles.

The roles can be defined by different types of business logic. For example, a pubsub component may manage notifications by logical groupings using a hierarchy such as Publishing entity-->Feed-->Topic. The roles may specify which clients are publishers for topics, while feeds are used to provide information about available topics, such as by providing a stream of notifications identifying different topics grouped in the feed. An entity associated with the publisher client may, for instance, establish a contractual or other relationship with entities associated with the subscriber clients that identify the subscribers as subscribers to the content. This information can be provided to pubsub component 102 for use in managing notifications between the publisher and subscriber clients.

However, other models may alternatively be used. As another example, a publisher client may simply provide an indication of one or more feeds, topics, or other logical groupings of content that it wishes to provide to pubsub component 102. Subscriber clients may interface with pubsub component 102 to establish subscriptions that are managed via pubsub component 102 without necessarily having a subscription, account, or other relationship with the publisher.

These and other models can be supported without changes to the notification delivery infrastructure through use of a notification relay service 104 configured to relay notifications received from publisher clients to subscriber clients based on the contents of a connectivity descriptor 106. Notification relay service 104 handles the details of interfacing with computing platforms used by publisher and subscriber clients to provide and receive notifications. As will be noted below, for example, a persistent network connection may be maintained between notification relay service 104 and one or more publisher and subscriber clients to receive and/or push notifications that are provided as one or more streams of data over the persistent connection, with each stream of notification data intended for or received from a corresponding exchange point.

Notification relay service 104 interacts with notification streams on the basis of an "exchange point" specified for each notification. An "exchange point" is used herein to refer to a logical unit used as a point of notification collection and/or distribution by the notification relay service based on permissions for the exchange point specified in connectivity descriptor 106. Essentially, an exchange point corresponds to a virtual "meeting point" at which notifications are received from one or more publisher clients and/or from which notifications are provided to one or more subscriber clients. For example, each topic may be associated with a respective exchange point. A feed that groups multiple topics may identify the respective exchange points for those topics and may provide additional data (e.g., feed metadata).

FIG. 1 additionally illustrates storage service 108. For instance, storage service 108 may be used to exchange the files specifying the connectivity descriptor. As an example, in some embodiments each client of the notification relay service may have a connectivity descriptor listing the client's access roles as a publisher or subscriber for various exchange points. By using a storage system, notification relay service 104 does not need to communicate directly with pubsub management component(s). For instance, multiple different pubsub management components may be used to create/update the connectivity descriptor via multiple different interfaces unknown to notification relay service 104.

FIG. 1 further illustrates an authentication service 110. Authentication service 110 may be used to positively identify publisher and subscriber clients to the notification system, although this functionality could be provided by pubsub component 102 and/or notification relay service 104 in other embodiments.

The underlying hardware used to implement architecture 100 can vary. For example, pubsub component 102, notification relay service 104, storage service 108, and authentication service 110 can be implemented using one or more computing platforms comprising a processor with access to a computer-readable medium embodying suitable program instructions or components. Functionality may be combined or distributed—for example, notification relay service 104 may be provided on a separate platform from pubsub component 102 in some embodiments, but both may be provided by the same platform in other embodiments. In some embodiments, pubsub component 102 may be implemented by a separate entity than that which implements notification relay service 104, with the pubsub entity providing data for use in the connectivity descriptor via an API or other arrangement.

Connectivity descriptor 106 may comprise data embodied in memory or another suitable computer-readable medium accessible to notification relay service 104. As an example, in some implementations connectivity descriptor 106 is maintained in storage service 108 based on updates from one or more pubsub components 102. Connectivity descriptor 106 can comprise one or more files, tables, or other data structures setting forth a plurality of exchange point identifiers along with client identifiers indicating client permissions with regard to the exchange points.

Each subscriber client 112, 114, and 116 and publisher client 118 may comprise a computing platform executing a suitable client application that facilitates connection to the notification system. Subscriber and publisher clients may use the same application or specialized subscriber and publisher variants may be used for receiving and sending notifications, respectively.

Initially, a subscriber client can log into the notification system by connecting to authentication service 110 via a suitable network connection (e.g., a secured http session). This is illustrated by subscriber client 112 logging in via connection 120. For example, subscriber client 112 may obtain a token after a successful login attempt for use in securely connecting to pubsub component 102 and/or notification relay service 104 and establishing its identity.

In some implementations and depending on the pubsub model that is used, subscriber clients may adjust subscriptions or other settings via a connection to pubsub component 102. This is represented by connection 122 between subscriber client 114 and pubsub component 102. For example, if subscriptions are managed via pubsub component 102 based on subscriber settings, subscriber client 114 may be able to view a list of available feeds, topics, or publishers of content to determine whether to subscribe to the feeds, topics, or publishers.

As another example, the notification relay service may support custom delivery options which can be set through interaction between the client and notification delivery service 104. For instance, a client may provide settings for certain types of notifications to be delivered based on the time of day and/or the client's location. These and other custom delivery preferences can be managed by providing appropriate commands and/or preference settings to notification relay service 104. Thus, delivery options can be managed independently of publisher-subscriber relationship. However, a suitable API could be specified to allow for delivery preferences to be set via pubsub component 102 and then relayed to notification relay service 104.

In some embodiments, pubsub component 102 can provide subscriber client 114 with data indicating the exchange point(s) that correspond to the subscribed feeds, topics, publishers, or other content identifiers. Some embodiments allow for custom graphics and other components to be displayed with notifications—for example, notifications from a social networking service or another organization may be displayed along with the organization's logo or another graphic. Accordingly, pubsub component 102 can provide subscriber client 114 with such custom graphics. However, in some embodiments, custom graphics, feed metadata, and other components are provided via notification relay service 104, such as via an exchange point corresponding to the publisher or a particular feed.

As was noted above, various role management models may be used in managing which clients send and which clients receive notifications. For instance, in some models, pubsub component 102 does not manage the actual subscription or other relationship between a publisher and subscriber. Instead, pubsub component 102 may simply provide subscriber clients such as client 114 with the identity of one or more exchange points also known to a publisher client for relaying messages once subscriber client 114 is authenticated. In such an embodiment, the pubsub component is an advertisement mechanism for exchange points, but does not implement any business rules governing publisher-subscriber relationships.

For instance, one or more exchange points may simply be allocated for use by a particular publisher client. The publisher client can identify one or more subscriber clients to receive notifications via the exchange point(s) and pubsub component 102 can then update the connectivity descriptor accordingly. For example, if known to the publisher client, the publisher client may identify the subscriber client by the subscriber client's user ID or other identifier for the notification system.

As another example, pubsub component 102 may receive data requesting permission for a publisher client designee to have listening access to a notification from the publisher client. For example, if the publisher client is a social network, the designee may comprise a user of the social network. Pubsub component 102 can include data in the connectivity descriptor indicating that the publisher client has permission to publish to an exchange point and provide data referencing the exchange point to the publisher client. The publisher client may or may not receive an identifier of the exchange point; instead, it may receive a feed identifier, topic identifier, or other reference that can be used by the notification system to correlate notifications to the exchange point.

Pubsub component 102 can identify a subscriber client corresponding to the publisher client designee. For example, a web-based or other interface may be provided for subscriber clients to select various services associated with publisher clients and provide login information for the service associated with the publisher client. The login information can be used to identify the subscriber client corresponding to the publisher client designee. For example, a social network publisher may identify the designee by user name or a user number. The login information provided to pubsub component 102 can be used to correlate the user name, number, or other identifier to a notification system client. Pubsub component 102 may attempt to match the information provided by its subscriber clients to information provided by its publisher clients or may simply submit the information to the publisher client to validate the match.

Once the subscriber client is identified, then pubsub component 102 can include data in the connectivity descriptor indicating that the subscriber client has permission to listen to the exchange point and provide data identifying the exchange point to the subscriber client for use in requesting notification delivery. Again, the client may receive an exchange point identifier or a reference (e.g. a topic or feed identifier) that can be correlated to the exchange point by the notification system.

As another example, a pubsub component 102 may provide an exchange point to a subscriber client for use in receiving messages. The publishing permissions for the exchange point may be set to allow any other client to publish to the exchange point unless the client is on a prohibited senders list. This could enable, for example, a more user-friendly alternative to email delivery—rather than an email address, the client could make its exchange point known to trusted clients but disallow those whose content is not desired (e.g. spammers). As an alternative, pubsub component 102 may provide an interface for the subscriber client to authorize other clients as publishers to the exchange point.

The use of connectivity descriptor 106 allows notification relay service 104 to operate without regard to or knowledge of the underlying relationship(s) and rules that result in notifications being sent to and from clients. The connectivity descriptor may express permissions resulting from multiple different publisher-subscriber and other relationships between clients of the notification relay service.

For example, some of the exchange points specified in the connectivity descriptor may comprise exchange points for use in relaying messages pursuant to publisher-subscriber relationships handled separately from the notification service (e.g., where a pubsub component simply advertises exchange points). Other exchange points may facilitate notification exchanges resulting from subscriptions handled via other pubsub components that implement business logic (e.g., paid subscriptions). Further exchange points may be used for collecting personal messages to relay to a subscriber clients, and still further exchange points used to distribute publicly-available information.

As another example, the same exchange point(s) may be used to facilitate exchange of notifications governed by different relationships. For example, a subscriber client may receive notifications, via an exchange point, from a publisher client that corresponds to an entity to which the subscriber client entity has a paid subscription. Another publisher client that corresponds to a social network service may have permission to publish social-network notifications to the subscriber client via the same exchange point. An instant messaging service may have rights as a publisher client to the same exchange point for the duration of an instant messaging session.

Rather than managing these disparate relationships, notification relay service 104 simply evaluates requests received from clients of the notification relay service to publish to or receive notifications from one or more exchange points by consulting connectivity descriptor 106. Connectivity descriptor 106 indicates which notification relay service clients are authorized to publish notifications to exchange points and which notification relay service clients are authorized to receive notifications published to exchange points by listening to the exchange points.

For example, a publisher client 118 may receive a token or otherwise authenticate itself to the notification relay service and then provide one or more notifications to notification relay service 104, with the notifications intended for a given exchange point. Notification relay service 104 can check connectivity descriptor 106 to determine if publisher client is entitled to push notifications via the exchange point; if the publisher is not permitted to do so, the notifications may be rejected. As another example, once a suitable connection (such as a persistent TCP connection discussed below) between notification relay service 104 and client 116 is established, subscriber client 116 may request for notifications to be pushed from the exchange point. Notification relay service 104 will only push notifications from those exchange points to which subscriber client has permission to listen.

It should be appreciated that any of the clients 112, 114, 116 could be publishers for certain exchange points and publisher 118 could be a subscriber for certain exchange points. As an example, a series of messages could be sent between subscriber client 116 and subscriber client 114 once subscriber client has been connected to notification relay service 104. Each client 114 and 116 could be a publisher with regard to an exchange point for which the other is a subscriber. If both were publishers and subscribers with regard to an exchange point, then the resulting notifications would be more like a chat-room experience where notifications are echoed to each party.

Figure 2:
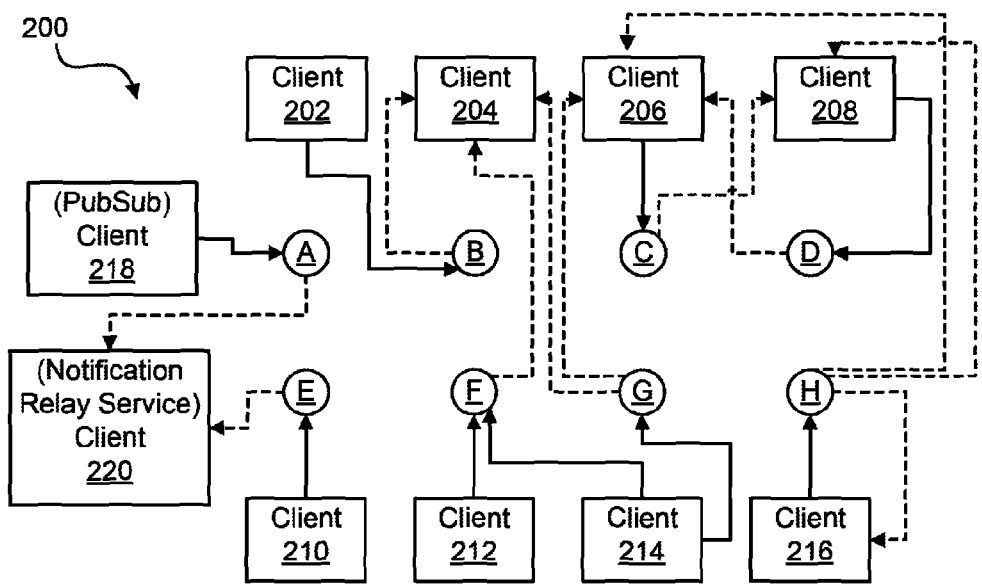
FIG. 2 is a block diagram schematically illustrating permission settings of an exemplary connectivity descriptor.

FIG. 2 is a diagram illustrating permissions expressed in an exemplary connectivity descriptor 200. For example, the permissions represented schematically in FIG. 2 may be expressed as data in one or more files maintained in a computer-readable medium. Connectivity descriptor 200 can be used by a notification relay service to determine which streams of notification data intended for a plurality of exchange points A through H to accept and whether to allow requests to listen to exchange points A through H (i.e. whether to push streams of notification data to particular clients).

For example, when a connection is established to a client, the appropriate connectivity descriptor can be consulted to determine which exchange points the client has permission to listen to, and to push respective streams of notification data corresponding to the exchange points. Further, when the connection is made, the connectivity descriptor can be checked to determine if the client has permission to publish to one or more exchange points, and, if so, one or more stream of notification data from the client can be accepted and associated with the respective end points. In some embodiments, the connectivity descriptor is checked once—at the time a connection with the client is made by the notification relay service—although the relay service could force the client to reconnect (e.g., when the connectivity descriptor changes).

This example illustrates a plurality of clients 202, 204, 206, 208, 210, 212, 214, and 216. In this particular example, permissions for multiple clients are illustrated in the same connectivity descriptor, but as noted above, in some embodiments, each client has a corresponding connectivity descriptor.

Connectivity descriptor 200 provides no express indication of the roles of the clients or relationships between the clients, but instead expresses read and listen permissions for the clients with regard to the exchange points. This example further illustrates that pubsub component 218 and notification relay service 220 have corresponding clients with permission to publish to and/or listen to certain exchange points to indicate that even the pubsub component 218 and notification relay service 220 can be treated as clients in the connectivity descriptor to relay system-related information.

In this example, solid arrows are used to indicate permission to publish a notification to an exchange point and dotted arrows are used to indicate permission to listen to an exchange point. In this example, Client 202 has permission to publish to exchange point B. Client 204 has permission to listen to exchange points B, F, and G. Client 206 has permission to publish to exchange point C and listen to exchange points D and H. Client 208 has permission to publish to exchange point D and listen to exchange points C and H. Client 210 has permission to publish to exchange point E. Client 212 has permission to publish to exchange point F. Client 214 has permission to publish to both exchange points F and G. Client 216 has permission to publish to and listen to exchange point H.

The particular form in which permissions are expressed and interpreted can vary. For example, an exchange point may be controlled by strong permissions so that a client must be expressly authorized to publish to or listen to the exchange point. The permissions may be exclusive—that is, an exchange point may be "open" for publishing and/or listening for all but certain specified clients. Some exchange points may be configured as completely open so that no permission is required to listen to the exchange point and/or no permission is required to publish to the exchange point.

The permissions may arise from any number of relationships. For example, multiple clients are publishing to exchange point F, while multiple clients listen to exchange points G and H. Exchange point F may, in practice correspond to a distribution point for an aggregator of news feeds for a particular topic of interest to a user of client 204. Exchange point G may, in practice, represent a feed of postings from a particular blog author that are of interest to clients 204 and 206. Exchange point H may be established as a distribution point for announcements from an organization corresponding to client 216.

Exchange points C and D may be facilitating a messaging session between client 206 and 208. For instance, client 206 publishes a message to exchange point C, which is listened to by client 208. Client 208 publishes to exchange point D, which is listened to by client 206. Of course, the same communication could be facilitated by listening to the same exchange point by clients 206 and 208.

The clients of FIG. 2 do not necessarily correspond to different users or users at all. For example, client 202 may represent a print server that publishes a status notification to exchange point B which is listened to by client 204. As another example, client 202 may represent a process that reports the status of a hardware or software component of the same computing platform used to provide client 204. For instance, if the computing platform is a laptop computer or other portable device, client 202 may publish a low-battery message to exchange point B. Client 202 may publish a message from an operating system or other software component indicating that an update is available or required. Client 204 may listen to exchange point B to receive these status messages alongside communications from clients 212 and 214.

Client 210 has permission to publish to exchange point E which notification relay service client 220 has permission to listen to. For example, as will be noted in more detail below, certain embodiments of a notification relay service can support contextual notifications. As an example, client 210 may publish location information to exchange point E which is listened to by notification relay service 220 to determine delivery preferences based on client 210's location.

Pubsub client 218 has permission to publish to an exchange point A which notification relay service client also has permission to listen to. For example, pubsub client 218 may publish a notification to exchange point A to indicate that an update to the connectivity descriptor is available. The notification relay service can push the notification to "itself" (i.e. to notification relay service client 220) which then allows the notification relay service to take appropriate action based on the updated connectivity descriptor. Exchange point A may be subscribed to by all clients so that, when an update to the connectivity descriptor is made, the clients can update their view on the subscription list and re-establish a connection to the notification relay service. As another example, pubsub client 218 may publish a notification to another exchange point subscribed to by a client to indicate that an update to cached assets (e.g., artwork and other feed metadata) is available; in response, the client may update its copy of the cached assets.

A connectivity descriptor may include data beyond simply whether a client has permission to publish and/or listen to a given exchange point. For example, a client may be considered an "owner" of an exchange point, with this status indicating that the client has authority to grant or deny permission to publish/listen to the exchange point. Additionally, different classes of publishing and listening rights may be defined. For example, a client may have the right to publish to or listen to an exchange point, but not the right to delegate its publication or listening rights to another client. Thus, in addition to its use by the notification relay service, the connectivity descriptor may be consulted by pubsub components in determining how to handle listen, publish, and other requests.

Figure 3:
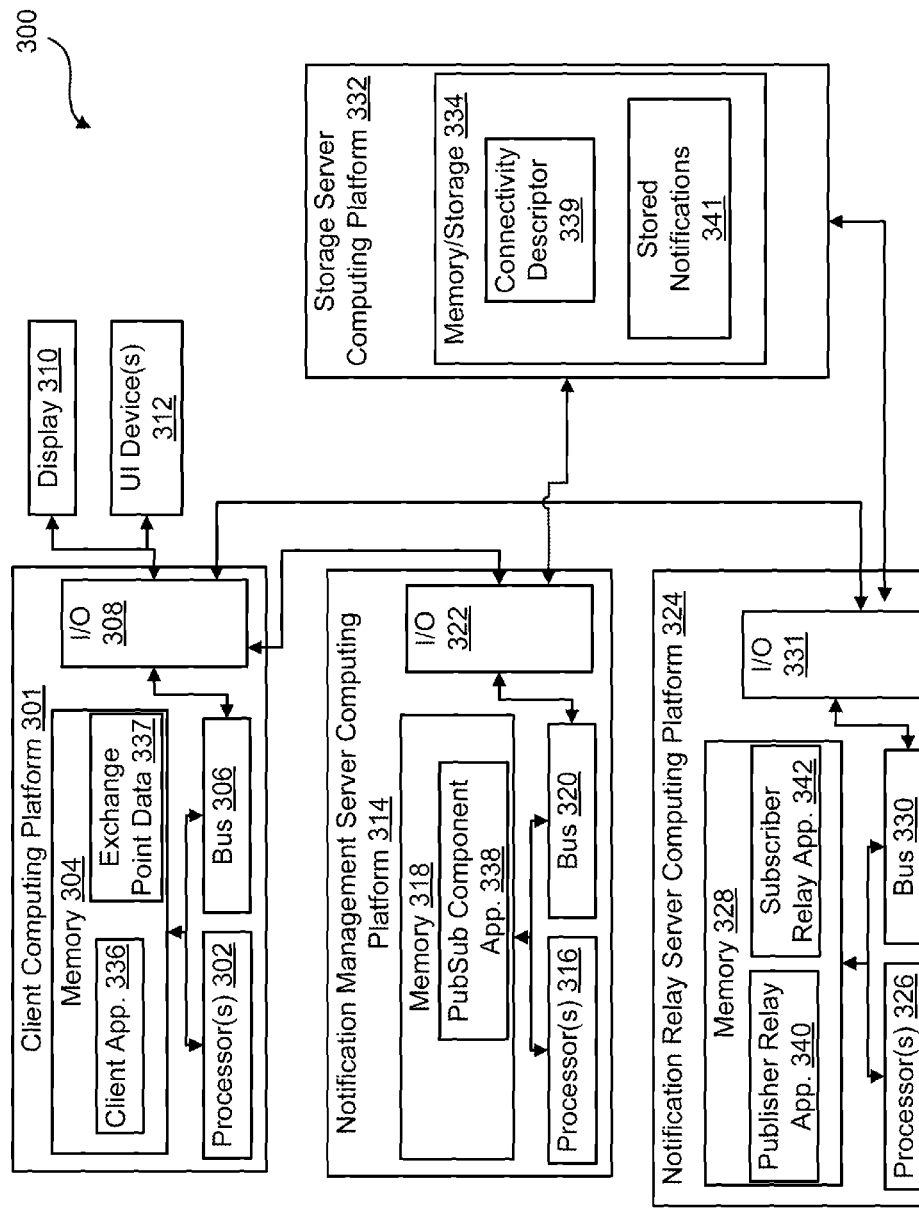
FIG. 3 is a block diagram of exemplary system components of a notification system, including an exemplary notification relay service, pubsub management component, and an exemplary client device.

FIG. 3 illustrates an embodiment 300 of a notification system. In this example, the notification system includes a notification management server computing platform 314 and a notification relay server computing platform 324. One exemplary client computing platform 301 is also shown, along with a storage server computing platform 332. In practice, notification system 300 may comprise multiple publisher and subscriber clients. Additionally, functionality of the servers may be distributed across multiple machines in one or more geographic locations.

Client computing platform 301 includes one or more processors 302 with access to memory 304 which comprises one or more computer-readable media such as RAM, ROM, flash memory, cache memory, or another suitable memory technology. Computing platform 301 further includes a bus 306 providing a data and control path between processor 302 and other components of computing platform 301. In this example, I/O components are illustrated generally at 308 and can include input/output components such as graphics cards, ports and busses for facilitating connection to external devices, and/or networking components such as network interface cards. As another example, if client computing platform 301 comprises a mobile device, then I/O components 308 may comprise a wireless transceiver to facilitate connection over a wireless LAN, cellular, or other link.

In this example, a display 310 such as an LCD, CRT, or other visual output is interfaced to computing platform 301 along with one or more user input (UI) devices 312 such as a mouse, keyboard, or the like. Other display and input examples can include LEDs and keypad or touchscreen entry for a mobile device. Audio and tactile (e.g. vibrate) output may be supported in addition to or instead of visual output in some embodiments.

Memory 304 embodies instructions and/or program components for providing a notification client application 336. As was mentioned above, a notification client may comprise a publisher client and/or a subscriber client. The same notification client application 336 may support both publishing and receiving notification data as a subscriber in some embodiments, while in other embodiments customized client applications may be used for each role. In some embodiments, client application 336 may represent a component or element of another application executed by computing platform 301 used to generate and/or receive notifications pertaining to the application.

Depending on the implementation context, client application 336 may display notifications using text, graphics, audio, visual and/or other components. Some notifications may not be output directly by a client. For example, a client may output a notification as data to another client that then outputs the notification and/or takes other action based on the notification content.

Client application 336 also identifies client computing platform 301 to the notification system and provides information to authenticate the client to the system. As was noted above with reference to FIG. 1, an authentication service may be used to provide a token to computing platform 301 for use in verifying its use of the notification system. Other suitable authentication methodologies could be used.

Client computing platform 301 also includes exchange point data 337 in memory. Exchange point data 337 is used by client application 336 to receive and/or publish notifications. For example, as will be noted below, client application 336 may provide a request to notification relay server computing platform 324 to listen to one or more exchange points and/or may request to publish notifications to one or more exchange points.

Notification management server computing platform 314 comprises one or more processors 316 with access to memory 318 via a bus 320 that also facilitates connection to I/O components 322. Memory 318 may comprise RAM, ROM, or other suitable computer-readable media. Relay server computing platform 324 comprises one or more processors 326 with access to memory 328 via bus 330, which also facilitates access to I/O components 331. Server computing platforms 314 and 324 may be configured with appropriate components to handle multiple simultaneous interactions with clients. For example, each server may include multiple processors, high-speed memory, and multiple network interface components. Functionality of either or both servers 314 and 324 may be distributed across multiple machines.

The memory 318 of notification management server computing platform 314 embodies instructions and/or program components of pubsub component application 338. In practice, pubsub component application 338 can comprise a suite of related components, processes, or applications. As will be noted in further detail below, pubsub component application 338 can include a web server or other suitable component(s) to provide a web interface to allow clients to set publishing and/or subscription preferences and delivery preference settings. As another example, a web or other interface may be provided to support requests from publisher clients to allocate exchange points and to coordinate providing permissions to subscriber clients. For instance, pubsub component application 338 may provide an API for publisher and/or subscriber clients to request permission for access to exchange points.

Pubsub component application 338 can further include components for expressing client settings in a connectivity descriptor 339 for use by the notification relay service. Connectivity descriptor 339 can be updated and maintained in memory/storage 334 of a storage server computing platform 332. Memory/storage 334 may represent one or more computer-readable media; due to the volume that may be involved in archiving notifications, memory/storage 334 may comprise mass storage. Storage server computing platform 332 may represent a system comprising one or more machines for providing storage and retrieval of data to support the notification system. In addition to the connectivity descriptor, storage server computing platform 332 may maintain stored notifications 341 published to various exchange points for later distribution to subscriber clients. Additionally, delivery and viewing statistics may be maintained in memory/storage of computing platform 332.

In this example, notification relay server computing platform 324 handles the receipt and delivery of notifications based on accessing the connectivity descriptor. Memory 328 of the notification relay server platform embodies instructions or program components for a publisher relay application 340 that handles receipt of notifications and a subscriber relay application 342 that handles sending notifications to subscriber clients. Although separate applications are shown in this example, in some implementations, the same application can manage receipt of notifications from publisher clients and providing notifications to subscriber clients.

The notification relay application(s) can be configured to interface with storage server computing platform 332 and client computing platform(s) 301. For example, one or more applications, processes, or components can be configured to receive a request from a client computing platform 301 to establish a persistent connection, verify the authenticity of the client, and then access connectivity descriptor 339 to determine which exchange points to push notifications from and/or which exchange points the client can provide notifications to. The notification relay application(s) can also be configured to provide and retrieve stored notifications 341 to storage server computing platform 332.

Any suitable number and type of connections may be used to facilitate connection between and amongst computing platforms, 301, 314, 324, 332, and/or any other computing platforms comprising or in communication with notification system 300. For example, a wide-area network such as the Internet may be used. As additional examples, some embodiments of the notification system could be implemented using a local area network or virtual private network.

Figure 4:
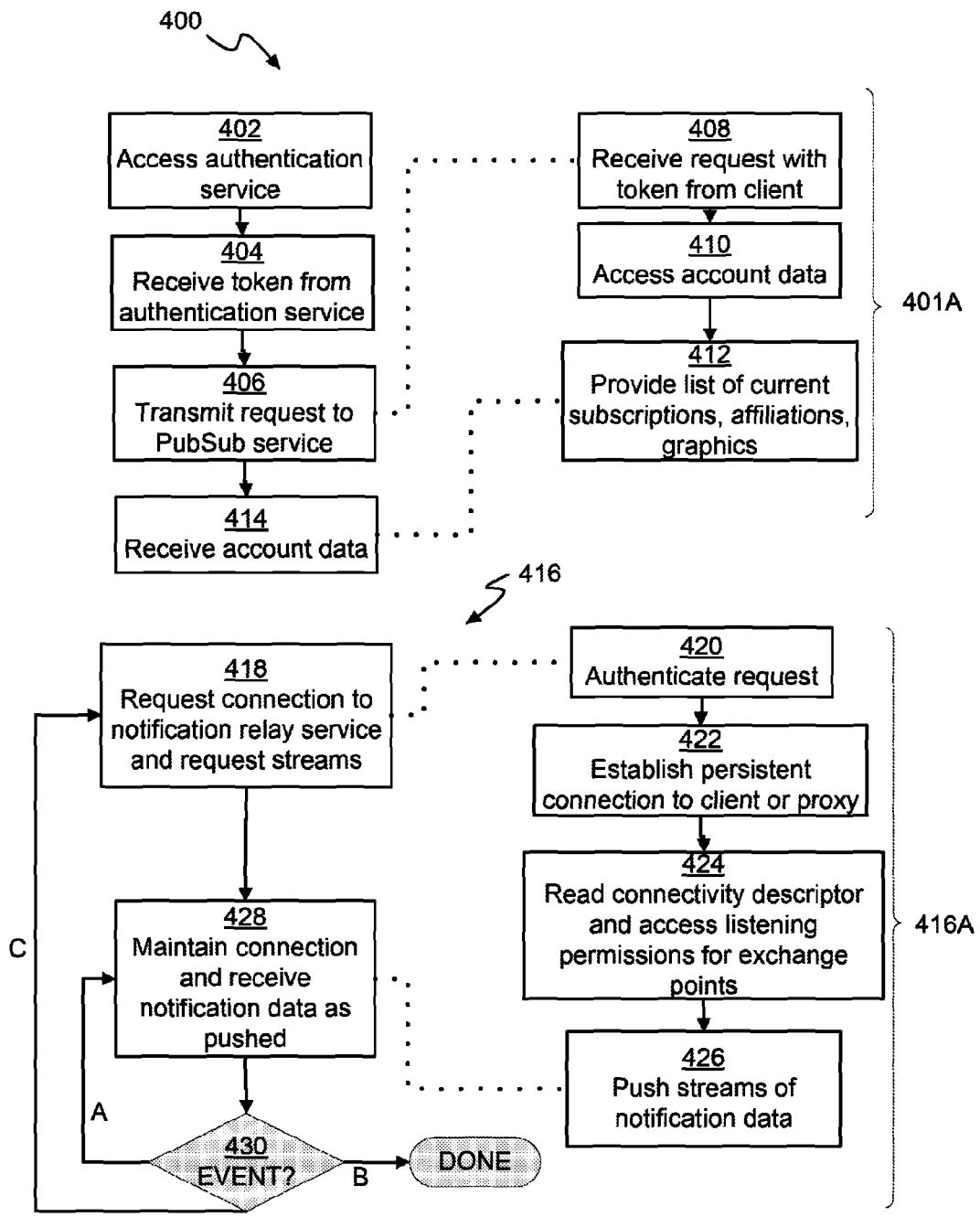
FIG. 4 is a flowchart showing steps of an exemplary method for sending notifications to subscriber clients.

FIG. 4 is a flowchart showing an exemplary method 400 for authenticating a client managing subscriptions and a method 416 for delivering notifications to a client depicting activity at the client and server side. For instance, client application 336 of client computing platform 301 in FIG. 3 may be configured to perform the steps on the left side of the page while flows 400A and 416A may be carried out by one or more server-side components of the notification system.

At block 402 of flow 400, the client accesses an authentication service for the notification system. For example, the notification system may provide an authentication server for associating each client account with a client ID and password. At block 404, the client is validated and, assuming successful validation, receives a token for use at block 406 when the client transmits a request to the Pubsub component and/or for when the client requests a connection to the notification relay service. For example, a client application may receive a token or other suitable identifier when authenticated and can use the token to identify itself to the Pubsub component via a secure HTTP request to notification management server computing platform 314 of FIG. 3.

Flow 401A represents initialization activity handled in some embodiments by the pubsub component. For example, Pubsub component application 338 of notification management server computing platform 314 in FIG. 3 may be configured to operate in accordance with flow 401A. At block 408, the pubsub component receives a request from the client for access to subscriptions, etc. This may comprise receiving an authentication token and correlating the token to account data for the client. In this example, since the client is a notification consuming client (i.e. a subscriber), at block 412 the pubsub component provides subscriber data such as a list of current subscriptions, affiliations, and custom graphics associated with content streams to which the client is subscribed.

As was noted above, in some instances, the pubsub component manages subscriptions or other relationships between publishers and clients. Thus, the account data may be the result of configuration selections facilitated by the pubsub component. Flow 400 could further include providing commands from the client to select topics/feeds of interest, confirming or canceling subscriptions, etc. However, the pubsub component may obtain subscription, affiliation, and other information from the publisher in some embodiments. Still further, the publisher and subscriber may utilize the notification system simply as a point of exchanging information. In such cases, the account data could comprise data identifying one or more exchange points from which the client receives information without identification of subscriptions or inclusion of specialized graphics.

If a client already has data indicating which exchange point(s) to listen to, then conceivably no additional account data need be provided to the client. For example, a publisher may provide data identifying exchange points to the client directly or exchange point identifiers may have previously been provided to the notification client and cached locally.

Flow 416 represents connecting to the notification relay service to receive notifications. For example, flow 416 may begin once the client has completed flow 400. However, flow 416 may be initialized using cached authentication tokens and subscriber data without the need to contact the pubsub component in some embodiments. As another example, a client may perform blocks 402 and 404 and then proceed directly to block 418 in some embodiments.

Turning to flow 416 in detail, at block 418 the client requests connection to the notification relay service and requests access to one or more streams of notifications. In some embodiments, the subscriber data provided to the client can include data for accessing the notification relay server if such data is not otherwise known to the client. For example, a URI (uniform resource indicator) for notification relay server computing platform 324 may be provided to the client for use in establishing a connection to receive notifications.

The request may specify the streams by reference to one or more exchange points or other identifiers from which the exchange point(s) of interest can be determined. For example, the account data provided to the client may indicate which exchange points are associated with streams to which the client subscribes or otherwise desires to access.

Flow 416A represents notification relaying activity handled in some embodiments by the process(es) of a notification relay server. For example, subscriber relay application 342 of notification relay server computing platform 324 in FIG. 3 may be configured to operate in accordance with flow 416A.

At block 420, the connection from the client is verified. For example, the token may be evaluated to ensure that the request is from a proper client. At block 422, a persistent connection is established between the relay service and the client or a proxy thereof. Although in this example the client requested the connection and the notification relay service responded, in some embodiments the notification relay service could be provided a client URI to request a connection from the client. As an example, the pubsub component could request the client URI and then forward the information to the notification relay service.

The persistent connection in some embodiments is established between the notification server and the client as a persistent TCP connection, although other connection types may be used. In some embodiments, the connection is made using RMTP (Real Time Messaging Protocol), although another suitable protocol for streaming audio, video, and other binary data can be used.

A persistent connection can facilitate real time notification. However, certain clients may be precluded from establishing such connections. As an example, a client computing platform may be behind a firewall. In such embodiments, a proxy such as a protocol gateway can be used to forward data to the client, with the persistent connection being made between the gateway and the notification relay service.

At block 424, the notification relay service reads the connectivity descriptor and determines the client's permissions for the streams based on the connectivity descriptor contents. At block 426, the notification relay service pushes notifications in one or more streams of notification data (if available) via the persistent connection to the client. For example, as incoming notifications addressed to the exchange point are received from one or more publisher clients the notifications can be pushed to the client in real time or near real time (with near real time referring to the brief delay that may result as the notifications make their way through the notification relay system). As another example, recorded notifications that are associated with the exchange point, but were provided when the connection to the client was unavailable or when the client had paused notification delivery may be retrieved from storage and pushed via the connection.

At block 428, the persistent connection between the client (or proxy) and notification relay service is maintained, and notification data (if any) is received for handling by the client. Even if no current or previous notification data is available for any exchange point for which the client has listening access, the client and notification relay service may nonetheless maintain an open line so that the client can receive notification data as it is published to the exchange point(s).

Notifications received by the client may be output in any suitable manner and can comprise any suitable content. For example, in some embodiments, a pop-up display including text or graphics is rendered on a screen for review by one or more users. Notifications may comprise video and/or audio components in addition to or instead of text/graphics. For instance, the stream(s) of notification data may comprise binary multimedia data such as text, graphics, audio, and/or video. The stream(s) of notification data may comprise multimedia instruction data and/or other executable instructions for the client to dynamically render notifications, such as using the ADOBE® FLASH® PLAYER or AIR® execution environment.

In some embodiments, the relay application can support requests for past notifications. For example, recorded notifications for an exchange point over a given time interval may be requested by the client in order to browse past notifications or to support a "log view." Permission to access stored notifications can depend on permissions in the current connectivity descriptor and/or permissions as expressed in the connectivity descriptor during the requested time interval(s).

Block 430 ("Event?") is illustrated to show that, as the connection is maintained, the client-side application(s) can monitor for one or more events (including outside events and/or user input) that change notification delivery. Branch "A" represents ongoing delivery of notifications, i.e., no changes in delivery preferences or conditions. Branch "B" represents a termination event, such as shutdown of the notifier application, user command to stop notifications, loss of a connection, etc.

Brach "C" is included to illustrate that, in some embodiments, an incoming notification can cause the client to re-establish its connection to the notification relay service, even if the connection is not otherwise interrupted. This may, for example, allow for handling of changes to the connectivity component, which in some embodiments is only checked once—at the time the persistent connection to the client is established.

For example, as was noted above, updates to the connectivity descriptor may be made by the client or by one or more publishers, such as if a client becomes subscribed to a new topic, unsubscribed from a topic. In some embodiments, the pubsub component and/or the notification relay service itself can publish a notification to an exchange point listened to by the client to cause the client to re-establish its connection. Thus, the connectivity component (as updated) will be read at 424 and used to push streams of notification data. In this example, branch "C" loops to block 418, but in other embodiments, complete re-authentication/login to the notification service could be required.

Figure 5:
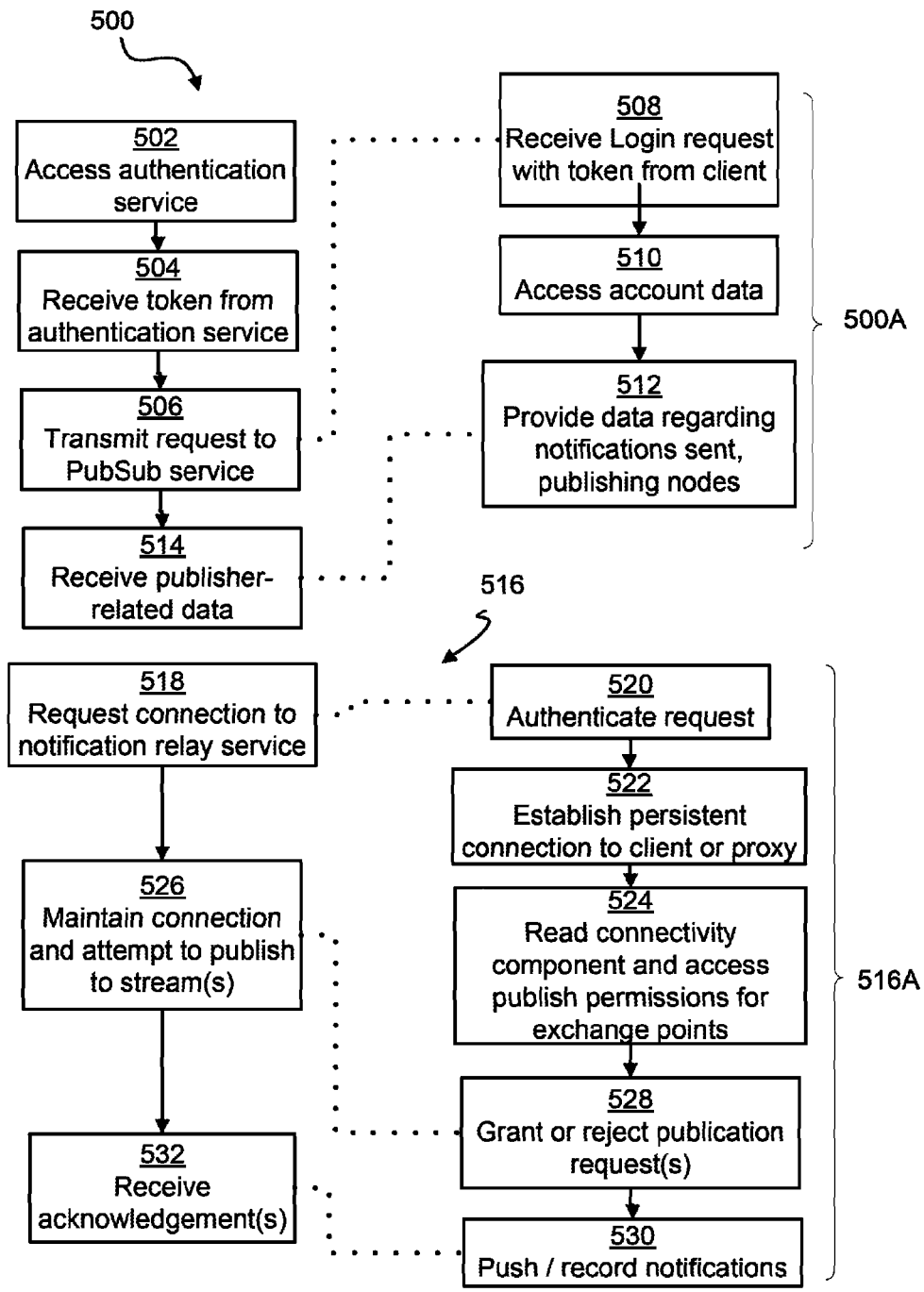
FIG. 5 is a flowchart showing steps of an exemplary method for receiving notifications from publishing clients.

FIG. 5 is a flowchart showing an exemplary method for receiving notifications from a publisher and depicting activity at the client and server side. For instance, client application 336 of client computing platform 301 in FIG. 3 may be configured to perform the steps on the left side of the page while flows 500A and 516A may be carried out by one or more components of the notification system. In some instances, the client may be a publisher client or may be both a subscriber client and a publisher client.

Flow 500 represents publisher activity for managing subscriptions and receiving subscription-related data and also illustrates an authentication step. At block 502 of flow 500, the client accesses an authentication service for the notification system. For example, the notification system may provide an authentication service for associating each client account with a client ID and password as was the case for subscriber clients.

At block 504, the client is validated and, assuming successful validation, at block 506 the client transmits a request to the pubsub component. For example, the client application may receive a token or other suitable identifier and use the token to identify itself to the Pubsub component via a secure HTTP request to notification management server computing platform 314 of FIG. 3.

If a subscriber client is also to act as a publisher client and has already received a token when logging on to consume notifications, then authentication may not necessarily need to be repeated. Similarly, a publisher client that also is a subscriber may not necessarily need to separately login to receive a token for receiving notifications, although in some embodiments the publisher and subscriber functionality for a client could be managed with different logins or different tokens for the same client.

Flow 500A represents initialization activity handled in some embodiments by the pubsub component. For example, Pubsub component application 338 of notification management server computing platform 314 in FIG. 3 may be configured to operate in accordance with flow 501A. The pubsub component may handle interactions with publisher clients using the same components used to interact with subscriber clients or may include publisher-specific components, APIs, and the like to facilitate publishing via the notification relay service.

At block 508, the pubsub component receives a login request from the client with an authentication token. In this example, since the client is a publisher client, at block 512 the pubsub component provides data including nodes (or other logical references) to which the publisher can publish, and information for use in coordinating publishing to subscriber clients (if the subscriber clients are known to the publisher client). In this example, the pubsub component has access to data indicating sent notifications; for example, the pubsub component may request such data via an API of the notification relay service. In some embodiments, statistical data on sent notifications could be obtained directly from the notification relay service rather than a pubsub component.

The account data can include data identifying exchange points for use by the publisher in submitting notifications. For example, the publisher may request exchange points to be allocated for use by the publisher and provide subscriber client identifiers at block 506, with the exchange point identifiers provided at block 512. The pubsub component can track which exchange points are associated with the publisher to properly coordinate subscriber client activity. For example, if a directory is provided, the publisher client may be identified with nodes in the directory that correspond to the exchange points.

The pubsub component may also provide information on contacting the notification relay service if such information is not already known to the publisher client. For example, a URI (uniform resource indicator) for notification relay server computing platform 324 may be provided to the client for use in establishing a connection to receive notifications.

If a publisher client already has data indicating which exchange point(s) to push notifications to, then conceivably no additional account data need be provided to the client. For example, the publisher may have previously obtained exchange points and provided the exchange points to its subscriber clients directly. The publisher client may also request changes to the connectivity descriptor, such as adding or removing listening permissions for certain subscribing clients with regard to exchange points for which the publisher client has control.

Flow 516 represents connecting to the notification relay service to send notifications and providing other data to the service. For example, flow 516 may begin once the client has completed flow 500. However, flow 516 may be initialized using cached authentication tokens and publisher-related data without the need to contact the pubsub component in some embodiments. As another example, a publisher client may perform blocks 502 and 504 and then proceed directly to block 518 in some embodiments.

At block 518 the publisher client requests connection to the notification relay service. Flow 516A represents notification relaying activity handled in some embodiments by the process(es) of a notification relay server. For example, publisher relay application 342 of notification relay server computing platform 324 in FIG. 3 may be configured to operate in accordance with flow 501B.

At block 520, the connection from the client is authenticated. For example, the token may be evaluated to ensure that the request is from a valid client of the notification system and not an unauthorized application purporting to be a client. At block 522, a persistent connection is established between the relay service and the client or a proxy thereof. Although in this example the client requested the connection and the notification relay service responded, in some embodiments the notification relay service could be provided a URI for the client and the relay service could initiate the client connection. As an example, the pubsub component could request the client URI and forward the information to the notification relay service.

The persistent connection in some embodiments is established between the notification server and the client in some instances as a persistent TCP connection using RTMP or another suitable protocol as noted above. However, as was noted above, a proxy such as a protocol gateway can be used to forward data from a publisher client lacking the ability to communicate over the persistent connection, with the persistent connection being made between the gateway and the notification relay service.

At block 524, the relay service reads the connectivity descriptor and accesses streams for the exchange points specified in the connectivity descriptor. At block 526, the publisher client maintains its persistent connection and provides a request specifying one or more exchange points that correspond to streams that the client wishes to publish to along with one or more streams of notification data to be published. For example, the request to publish may include the data directly or may include a link to a resource of the publisher client that provides a stream or feed of notifications whose intended destination is the exchange point (or the exchange points) specified in the request to publish.

As was noted above with regard to listening to exchange points, a client may request a persistent connection and may have permission to publish to exchange points, but may not actually publish any notification data to the exchange point(s). Rather, the persistent connection can be maintained and used until needed or until terminated by the publisher client or the notification relay service. For instance, in some embodiments, publishing clients also are subscriber clients at least with regard to an endpoint which can receive a notification causing the client to re-establish the connection as noted above in FIG. 4 after a connectivity descriptor refresh or other event.

At block 528, the notification relay service evaluates the requests from the client and grants or rejects the requests based on permission settings for the exchange points as specified in the connectivity descriptor. For example, if the client requests to publish notifications to an exchange point that the client lacks permission to publish to, the request is rejected.

At block 530, the notification relay service receives the notifications provided by the publisher client and pushes the notifications to subscriber clients (if any) connected to the system. For example, as incoming notifications addressed to the exchange point are provided by one or more publisher clients, the notifications can be pushed to subscriber clients in real time or near real time (with near real time referring to the brief delay that may result as the notifications make their way through the notification relay system and other network components).

Additionally or alternatively, the notification relay service may record the incoming stream of notification data and store the data in a computer-readable medium for later retrieval. For example, notifications may be stored along with identifying information associating the notifications with intended exchange points and time indicators for later playback to subscriber clients in a DVR (digital video recorder)-like fashion. This may allow for asynchronous delivery of streams of notification data and may allow subscriber clients to "catch up" with notifications that would be otherwise missed due to a lack of connection to the service. Additionally, the storage of the notifications can be used as an archive, if desired, by the publishing clients. Notification storage settings may be specified by publisher clients as part of setting up an account with the publishing service, as part of requesting an exchange point, and/or may be specified in the notification publishing request(s) provided by the publisher client.

For example, in some embodiments, a subscriber client can provide one or more playback commands indicating a point in time for a stream of notification data. The point in time may be "current," which indicates that the client wishes notification data to be streamed in real-time or near real-time. However, the command may indicate an earlier point in time, and the stream of notification data can be pushed from that earlier point in time. The playback command may specify a rate—for example, the notification data may be provided to the client at an increased rate to facilitate "catching up" over a shorter time interval than if the data were delivered at its original rate.

In some embodiments, the playback command comprises a "pause" command that directs the notification relay service note a point in time at which notifications should no longer be pushed until a "resume" command is received from the client. For instance, a user of the notification client may desire to silence all notifications during a presentation or may anticipate a lack of connectivity. When the resume command is received, the notifications can be again streamed beginning from the point in time at which the stream(s) were paused. If notification data streams are not already being stored by the notification relay service, the "pause" command may direct the notification relay service to store the streams at least until they can be delivered to the client or are otherwise deleted.

The notification relay service may also record metadata regarding notification delivery. For example, in some embodiments, statistical data about notifications can be maintained to support an analytics service for clients of the notification relay service. As one example, the notification relay service may track which notifications are ultimately delivered to clients, which notifications are recorded but never retrieved, and when notifications are viewed.

Additional tracking may be supported. For example, when a notification is delivered to a subscriber client, the subscriber client application may report the conditions under which the notification was viewed (or ignored) at the client. For instance, the client application may track activity and events including, but not limited to, the time(s) at which a notification is displayed, the length of time the notification is displayed, user activity such as clicks, mouseovers, and/or deletion of the notification. This information may be reported back to the notification relay service and recorded. Some or all of the information may be reported to the publisher client, either in raw form or as part of aggregated data.

At block 530, the notification relay service provides one or more acknowledgements that are received by the publisher client. The number and nature of the acknowledgements can vary. For example, the notification relay service may provide basic acknowledgments confirming receipt of the notification(s) by the notification relay service. The acknowledgement(s) may additionally comprise delivery confirmation data when the notification is pushed to one or more client(s). As was noted above, in some embodiments, analytic data is generated by the notification relay service. Block 530 may represent delivering such analytic data to the publisher client.

In the examples of FIGS. 4 and 5 above, streams of notification data were provided to subscriber clients and received from publisher clients, respectively, after authentication to the notification relay service. It will be understood that, in some embodiments, a client may log in and establish a persistent connection to the notification relay service but not receive (or send) notification data with regard to certain exchange points for which the client has listening (or publishing) permission. For example, the read of the connectivity descriptor may establish that the client has permission to listen to a given exchange points but (assuming no stored notification data to "catch up" with), there may be no incoming stream of notification data until a publisher sends notification data to the exchange point.

Similarly, a publisher client be established to have permission to publish to a number of exchange points, but may not publish streams of notification data to some or all of the exchange points until suitable content is ready. Thus, some exchange points may function as an "open line" for ready for immediate publishing when appropriate data is addressed to the exchange points without the attendant delay of login and/or checking permissions when the notification is actually published. Of course, in some embodiments, the notification relay service can still support a time-out after a suitable interval of no activity.

Figure 6:
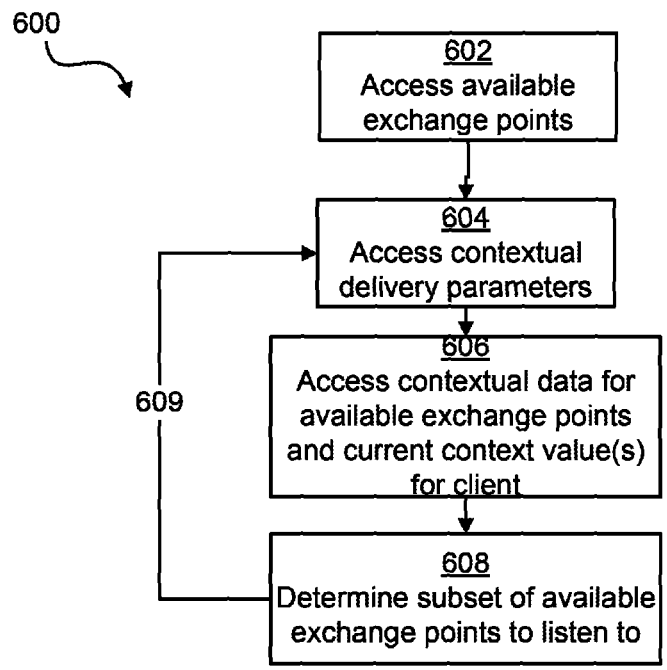
FIGS. 6 and 7 are each a flowchart showing steps of an exemplary method for delivering context-based notifications.

In some embodiments, the notification system supports delivery of fewer than all notifications a client has permission to listen to and/or ongoing changes in permission based on contextual parameters. FIG. 6 is a block diagram showing steps in an exemplary method 600 for context-based notification delivery. In this example, blocks 602-608 may be implemented by a client application such as client application 336 of FIG. 3. As indicated by arrow 609, context-based delivery may be an ongoing process—that is, as the contextual delivery parameters change, the subset of exchange points of interest may also change.

Block 602 represents accessing available exchange points. For example, in some embodiments a client application can receive data identifying one or more exchange points from the pubsub component and then request to listen to the exchange point(s) subject to approval by the notification relay service. For instance, the exchange points may be specified during an initial setup and cached by the client and/or the exchange point data may be provided when the client logs into the notification system.

At block 604, the client accesses contextual delivery parameters representing one or more delivery settings/preferences specified for the client. The contextual delivery parameters may be stored locally on the client or may be maintained by the pubsub component (or another service of the notification system) and provided to the client. Contextual delivery preferences may be specified via a preferences pane or other dialog provided by a client application and/or may provide the preferences via a web page (or other suitable interface) provided by the pubsub component.

Generally speaking, contextual delivery parameters may be specified in terms of contextual values for the client and/or one or more exchange points. As an example, a user of the client may specify a geographical limitation, such as a limitation that only notifications from exchange points related to a specified geographical area of interest, or a geographical area relative to the client's current location should be delivered. As another example, the user may specify a time-of-day or content limitation for delivery of notifications from certain exchange points.

At block 606, the client accesses contextual data values for the client and/or the exchange point(s) for which the client has listening (or publishing) permissions. Contextual data can include, but is not limited to: client device type or identity, client device location, the current time of day at the client device location, the current time of day at another given location, time zone, direction of movement, speed of movement (i.e. velocity), the proximity of the client's location to another moving device or a stationary device/location. As another example, contextual data may comprise the frequency of notifications from a particular exchange point or publisher and/or other feedback regarding notifications (such as actions taken in the past upon receipt of certain notifications).

Contextual values for exchange point(s) may be provided to the client in any suitable way, and may be delivered in a stream of notification data from another exchange point (i.e., each exchange point has one or more associated "metadata" exchange points that broadcast contextual information for the exchange point). The contextual value(s) for an exchange point may include a geographic location, time of day, or other information. Contextual values for an exchange point may be associated with one or more other clients associated with the exchange points or may be independent of any other clients (e.g., an exchange point may be associated with a fixed geographic location or area while another exchange point is associated with a geographic location or area relative to the location of a client associated with the exchange point).

As another example of obtaining context values for exchange points, the client may be aware of one or more organizational structures mapping the exchange points of the connectivity descriptor to context values due to information provided by the pubsub component. For instance, the connectivity descriptor may be organized into a tree or other logical structure by geographic location, with the tree identified by the pubsub component or provided in a stream of notification data from an exchange point (e.g., a feed of geographical location exchange points). Thus, each exchange point may have a context value comprising a fixed location, with the fixed location determined from the organizational tree. Other logical structures that can be mapped onto the connectivity descriptor for sorting exchange points include content topics (and hierarchies of topics), locations, publishers, subscribers, and languages.

Block 608 represents the client determining a subset of available exchange points to listen to by finding those exchange points that meet the requirements of the contextual delivery parameters in light of the contextual data of the exchange points and/or the client's current context value(s).

In this example, based on the information about the exchange points of the connectivity descriptor, the client can identify the exchange points corresponding to its geographic context. For example, the contextual data may include an identification of geographic coordinates of the client device determined via global positioning system (GPS) capability of the device, user input, and/or another suitable technique. The contextual delivery parameters may indicate that only notifications relevant to the 10-mile area surrounding the device should be delivered. Accordingly, the geographical context values for the available exchange points can be used by the client to determine which (if any) available exchange points meet the geographic criteria.

As noted above, a contextual parameter can comprise a direction of movement. For example, a client device may include in its current context data its current direction of movement. Direction of movement may be specified in any suitable manner, e.g., compass headings, vectors, etc. A contextual delivery preference may indicate for the client to listen to exchange points associated with a desired direction of movement or range of directions. As a further example, the direction of movement may be used to identify exchange points associated with locations that the client is moving towards or away from. The context for the exchange points may also include a direction of movement—for instance, a first client may tune into a second client's exchange point(s) if the first client and second client are moving toward (or away from) one another.

As a specific illustration, exchange points may be mapped to specific routes or portions of routes in a road network. The contextual delivery parameters may indicate that only notifications from exchange points relevant to the current route segment are to be delivered. For example, a client may obtain traffic reports provided via an exchange point in a connectivity descriptor where exchange points are mapped to specific portions of an interstate or other road segment. To do so, the client can determine which route segment corresponds to its current location and can obtain its direction by a suitable technique (e.g., via tracking movement over time) and determine which traffic exchange point to listen to.

The traffic exchange points may be freely available. For example, a governmental entity such as a highway authority may have publishing permission to the traffic exchange points and any user may have listening permission. However this may not be the case. For instance, the traffic information may be a subscription based service from a private entity. Thus, the client would need to have listening permission facilitated via a pubsub component of the notification system.

Contextual delivery parameters may represent combinations of two or more rules. Continuing with the "traffic report" example, a different exchange point may be associated with different directions for the same highway (e.g. one for a portion of highway 280 North and another for the same portion, but highway 280 South). The current context can be evaluated in terms of location (i.e., the segment of highway 280 of interest) plus the direction of movement. Considering direction and speed of movement may assist in avoiding irrelevant information—for example, a client device moving beneath an overpass of highway 280 may be uninterested in traffic on highway 280 but its current location corresponds to a segment of the highway. However, if the client is moving westbound (or eastbound) the client device will not listen to the highway 280 traffic report exchange points. Traffic report or other exchange points may be listened to so that the "current" context retrieves information for an exchange point corresponding to an area "down the road" from the current location—i.e., for a client device moving northward on a first portion of highway 280, the client device may tune into an exchange point corresponding to a second (further northward) portion of highway 280.

As noted above, contextual data may be delivered via notifications from one or more other exchange points. For example, a second client device may stream its location to an exchange point listened to by a first client device. When the second device's location falls within a specified proximity threshold (relative to the first client device's current location or another specified location), the first client device may be "tuned in" to a publishing exchange point associated with the approaching second client device. As a specific example, a subscribing client device, such as a cellular telephone, may be aware of its current location and may have access to a number of exchange points at which friends or acquaintances publish their current location. When the subscribing client is in proximity to one of his or her friends (as determined from the location information published from via the friend's exchange point), the subscribing client device may tune into one or more exchange points to which the friend is streaming notification data (e.g., audio, video, and/or other information).

The second client device may also provide its current velocity along with its location. For example, a contextual delivery parameter used by the first client device may specify a maximum or minimum velocity to exclude, for example, "tuning in" to a client device moving along a nearby highway or rail line (or vice-versa—if the client is on a train or highway the client may only be interested in tuning in to devices moving at or near the same velocity).

Figure 7:
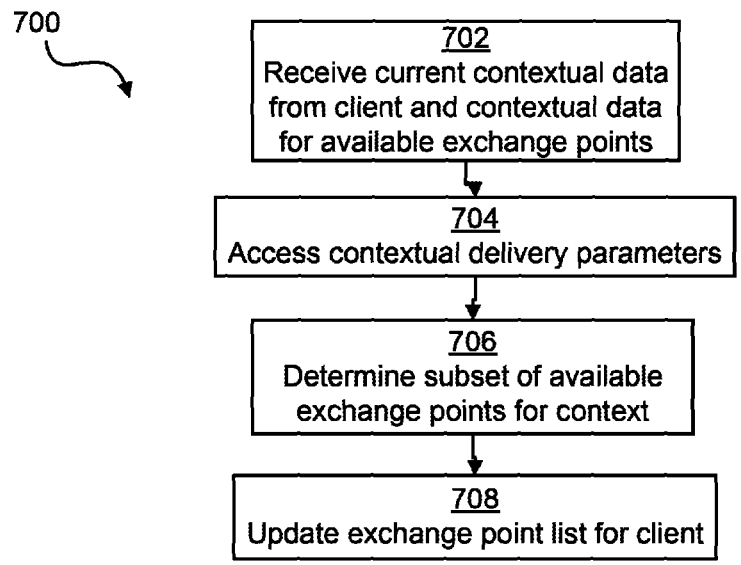

FIG. 7 illustrates an example of a method 700 for providing context-based notifications. In this example, contextual evaluations are handled remote from the client. For example, blocks 702-708 may be implemented by a management server such as management server computing platform 314 of FIG. 3. At 702, the service receives contextual data from a client. For example, a client may publish its current location to an exchange point known to the service. At block 704, the service accesses contextual delivery parameters. As was noted above, the parameters can include preferences for geographic-based delivery or blocking of notifications. In this example, the pubsub or other service determines which exchange points meet the delivery parameters at block 706 as noted above and at block 708 provides an updated list of relevant exchange points to the client.

In some embodiments, some context-based notification decisions are made at the client level while others are made at the service level. For example, determining appropriate exchange points for different time windows may be implemented by the client while determining appropriate exchange points for different locations may be implemented by the notification relay service.

Figure 8:
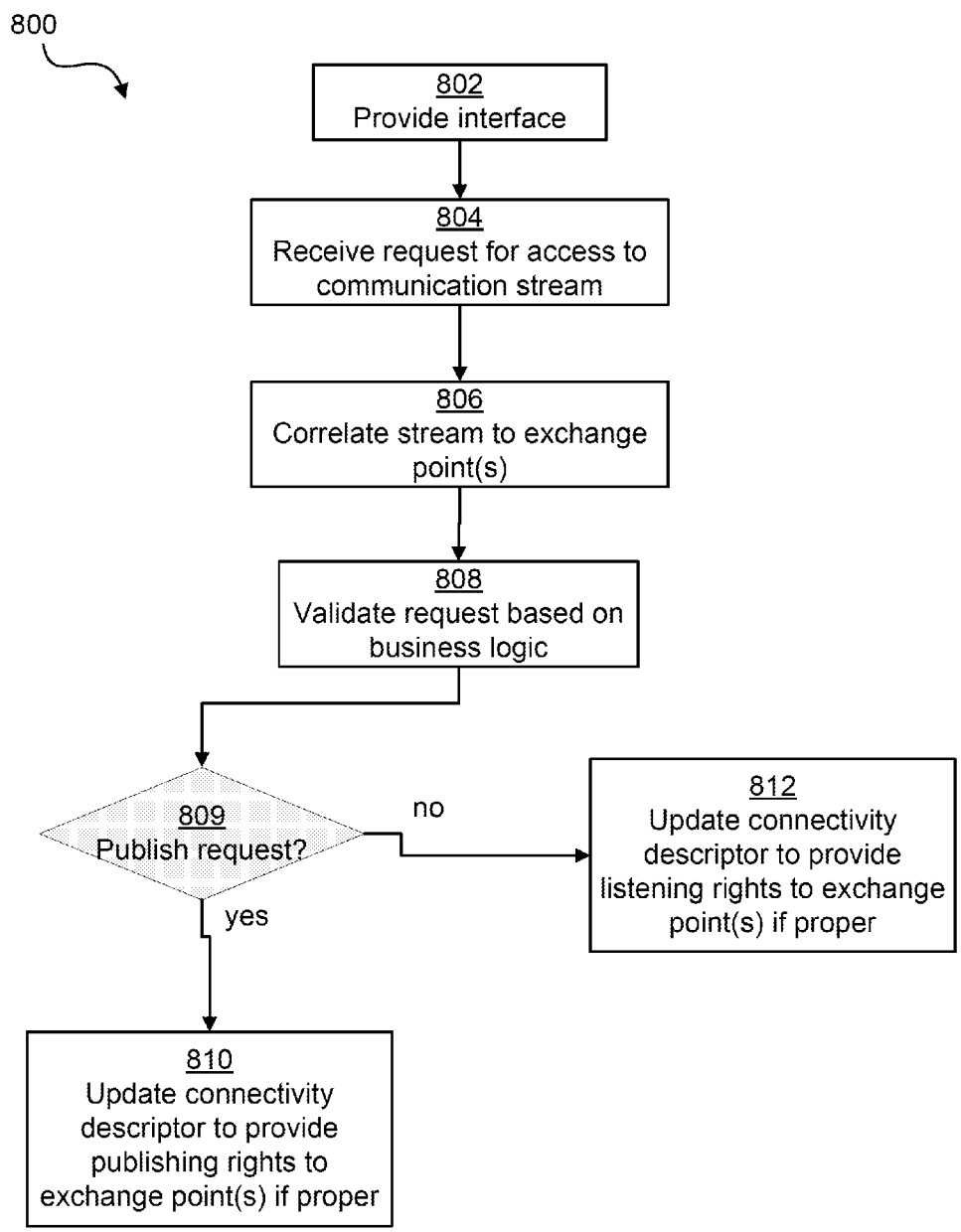
FIG. 8 is a flowchart illustrating steps of an exemplary method for managing a connectivity descriptor.

FIG. 8 is a flowchart illustrating steps in an exemplary method 800 for handling requests by clients for subscription to one or more communication streams. For example, a pubsub component may be configured in accordance with aspects of method 800 to allow publisher and/or subscriber clients to manage notification delivery via the notification system.

In this example, block 802 represents providing an interface for receiving input. For example, a web-based interface may be used by clients to provide requests for access to a communication stream. A "communication stream" can comprise a logical grouping for referring to notifications relayed via a notification system. For example, a communication stream may correspond to a "channel" for one or more notifications from a certain provider and/or having a certain topic, and the request for access may correspond to a request for publishing rights to the communication stream and/or listening rights to the communication stream.

The communication stream will ultimately be associated with one or more exchange points depending on the underlying business logic governing how publisher and subscriber roles are to be managed. However, regardless of the underlying business logic, the publisher and subscriber roles will be result in publishing and listening rights to one or more exchange points that are associated with the communication stream.

For example, in some embodiments, communication streams are correlated to particular topics in a hierarchy of topics. Each topic may correlate to a particular exchange point based on data maintained by the pubsub component. As another example, communication streams can be correlated to particular content feeds comprising a plurality of topics. Each feed may have an exchange point that is used to provide notification data that identifies the exchange points that correspond to the individual topics of the feed. Feed exchange points may also be used by publishers to distribute metadata, such as publisher logos, topic descriptions, and the like.

As a further example, a communication stream can be correlated to a particular publisher (e.g. a publisher "channel") or may be correlated to a particular subscriber. Each publisher or subscriber client may have a single or multiple exchange points allocated for their use in publishing or receiving notifications which the publisher or subscriber can then advertise or provide to other parties.

The web or other interface may, for example, provide a list of nested topics or feeds for selection by the requesting client. In some implementations, input received via the interface can be construed as a request for a subscription to a feed or topic. As another example, input received via the interface can be construed as a request for permission to publish content to a feed (e.g. a blog aggregator feed). As a further example, the web interface may list a plurality of publishers and publisher designations (e.g. "channels") corresponding to publisher exchange points. Input received via the interface can be construed as a request to receive notifications from the publisher channel(s). Similarly, the web interface may list a plurality of subscriber clients and subscriber designations (e.g. "addresses") corresponding to the subscriber exchange points, and input received via the interface can be construed as a request to provide notifications to the subscriber exchange points.

The input can comprise selections provided via checkboxes, menus, gestures (e.g. click, drag-and-drop), or other user input in a web interface. For instance, a form may allow a client to select a plurality of feeds, channels, or other content designators for streams and submit a request to listen to and/or publish to the streams. As another example, the input can comprise selections provided via an API (application programming interface) supported by the pubsub component or other interface provider. This may be used, for example, by a publisher or subscriber client to manage the details of access to notification streams independently of the notification relay service.

Block 808 represents validating the request via business logic. The notification relay service may be configured to handle the details of determining which clients are authorized to publish to or listen to certain streams. For instance, the pubsub component may maintain data indicating one or more "owners" of a communication stream and verify subscription or publishing requests via owner input. Accordingly, the pubsub component can provide interfaces for configuring streams, such as a web-based form for setting permission behavior.

Some or all of the business logic details may be handled independently of the notification relay service. For instance, in some embodiments the notification relay service simply allocates exchange points for use by publishers and subscribers. In such embodiments, block 808 may represent determining if a publisher or subscriber is properly referring to an exchange point and, if so, the request may be deemed valid.

For example, a social network provider and an end user may have a predefined relationship where the end user agrees to receive notifications from the social network provider and provides a client ID or other identifier of the end user's notification system client. The social network provider may use a publisher client to request permission via the API to publish to the end user's client. As another example, the end user may use a subscriber client to request via the API to listen to notifications provided by the social network provider and intended for a social network provider ID or other identifier for the end user in the social network. In response to the request, the pubsub component can update the connectivity descriptor accordingly and provide the appropriate exchange point identifier(s) to the requesting client to facilitate relaying the notification(s) as noted below.

Blocks 809-812 represent updating the connectivity descriptor based on the request. At block 809, the method determines if the request is a publish request. If so, then at block 810 the connectivity descriptor is updated to provide publishing rights to the exchange point or exchange points in question if the request is proper. For example, if a client requested permission to publish to a stream corresponding to a particular topic, data in the connectivity descriptor can be updated to reflect that the client has permission to publish to the exchange point(s) for that topic.

Block 812 represents updating the connectivity descriptor to provide listening rights if block 809 determines the request is not a request for publishing rights. For instance, the request may comprise a subscription request for a topic or a request to access a publisher channel. If valid, the connectivity descriptor is updated to allow the requesting client listening rights to the exchange point(s) that correspond to the topic or channel.

In this example, the flow is structured to update the connectivity descriptor to allow one of publishing or listening rights for ease of explanation. In some embodiments, the flow can handle a request for both publishing and listening rights to the same exchange points.

Figure 9:
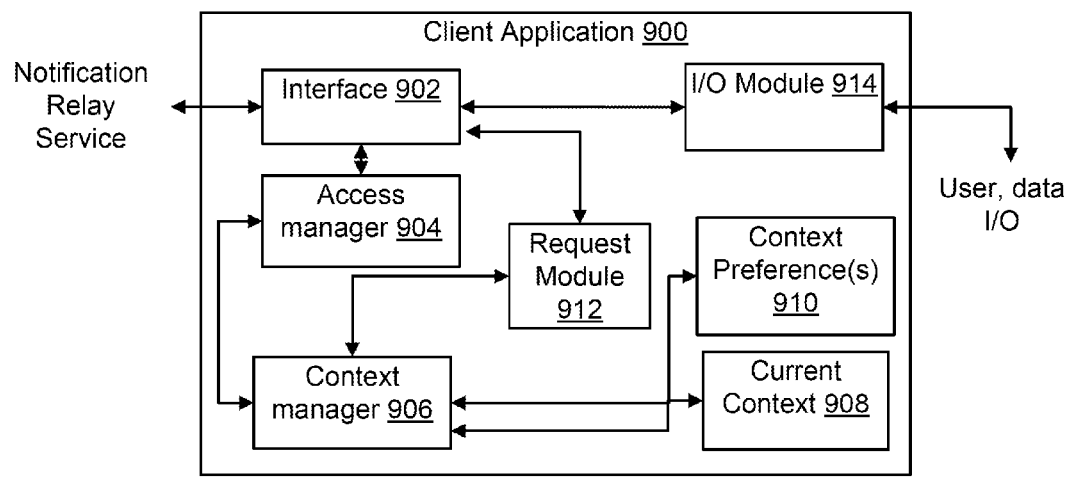
FIG. 9 is a block diagram illustrating components of an exemplary notification system client application.

FIG. 9 is a block diagram illustrating exemplary components of a notification client application 900 which, when executed, configures a computing device into a computing device for sending and/or receiving streams of notification data. In this example, application 900 includes an interface 902 configured to establish a connection to a notification relay service. For example, interface 902 can establish a TCP or other persistent connection to a notification relay service computing platform. If a client is to be used with a gateway, interface 902 can facilitate connecting to a suitable component executed by the gateway for establishing the persistent connection.

Application 900 also includes an access manager 904 configured to identify a plurality of exchange points for which the notification system client has listening and/or publishing access. For example, client application 900 may maintain a list of exchange point identifiers received from a pubsub component as noted above.

Interface 902 may facilitate a connection to a pubsub component to retrieve the exchange point identifiers and other data used to formulate requests to listen or publish to content streams. For example, a publisher may include a "badge" or other identifier on a web page which, when clicked on or otherwise interacted with, downloads an exchange point identifier for use by access manager 904 in requesting listening access. If, needed, the publisher may obtain identity information for the client and use a pubsub component to grant the client permission to listen to the specified exchange point by making appropriate adjustments to the connectivity descriptor.

In this example, client application 900 includes a context manager 906 configured to determine a subset of available exchange points for the notification system client to listen to that meet one or more context delivery preferences. For instance, context manager 906 can access current context 908, which comprises data representing a current context parameter for the notification system client and context delivery preferences 910 which comprise data representing conditions for delivery of notifications. Current context 908 may be updated based on device capabilities (e.g., GPS and/or triangulation for geographical location) and/or may be updatable using information received via a stream of notification data.

Some context delivery preferences may be independent of particular content streams. For example, the context preferences may direct client application 900 to block notifications from certain publishers, with certain content, and/or notifications delivered at certain times. However, other contextual parameters can be specified to control delivery of content streams based on the current context.

For example, context manager 906 can access data representing a contextual mapping of the exchange points for which the notification system has listening access. As was noted above, one or more organizational structures can map the exchange points of the connectivity descriptor for sorting and evaluation purposes. For instance, exchange points of the connectivity descriptor may be organized into a tree or other logical structure by geographic location. Other logical structures that can be mapped onto the connectivity descriptor for sorting exchange points include content topics (and hierarchies of topics), feeds, locations, publishers, subscribers, and languages.

Context manager 906 may have access to a contextual mapping for every exchange point in the client's connectivity descriptor in some instances. For example, the notification system may be configured for open access to a large number of exchange points for delivery of publicly-available information. As another example, the client may be required to subscribe or otherwise have permission in order to know of an exchange point and thereby see its place in a contextual mapping. The contextual mapping(s) may be provided by a pubsub component to the client application via interface 902 in some implementations.

Client application 900 also includes a notification request module 912 configured to provide a notification request comprising a client identifier and an exchange point identifier, the exchange point identifier indicating one or more exchange points of the subset. For example, once one or more exchange points that meet the current context of the notification client have been determined, those exchange points can be included in a request for access to a communication stream of the notification system. For example, the request may include a client identifier and identifiers for the exchange points. However, for a subscriber client, the notification "request" simply indicates that the client desires to listen to the exchange points; notification data may not be provided in response to the request, even if proper, if no notification data is available. For a publisher client, the request module can request permission to publish one or more streams to the identified exchange point(s).

Notification input/output (I/O) module 914 is configured to provide data for outputting notifications comprised in the stream or streams of notification data to which the client is listening. For publishing purposes, I/O module 914 can format data provided to client application 900 and, in communication with interface 902, provide a stream of notification data to the notification relay service.

When a notification is delivered, visual, audio, and/or other output can be provided. Certain notifications may be output via data to another component, such as a vibration mechanism for a portable device to provide tactile output. As another example, data may be provided to a software component other than client application 900 that displays the notification or takes other action.

As another example, the notification data stream may comprise multimedia instructions and I/O module 914 can comprise (or interface with) a multimedia playback application component (e.g., ADOBE® FLASH® or AIR®) for executing the multimedia instructions. If the instructions facilitate interaction between the client and publisher, I/O module 914, request module 912, and interface 902 can publish an appropriate stream of user feedback to an exchange point accessible by the publishing client(s) or other interested partie(s).

More generally, for publishing purposes, client input can include video, audio, and other data provided directly via one or more I/O devices (e.g., camera, microphone, keyboard, etc.) or indirectly from other applications via a suitable API.

In this example, both publishing and subscribing activity were discussed in conjunction with client 900. It will be understood that, in some embodiments, a publish-only or subscribe-only client could be used. Furthermore the functionality discussed above with regard to client 900 may be integrated into other software components (e.g., operating system, email or messaging program, etc.).

In the example above, notification client application 900 supported context-based delivery of notifications. The same principles could be used to support context-based publishing of notifications. Context publishing preferences could be specified by the client in terms of the client's current context and/or the context values for one or more exchange points to which the client may conditionally desire to publish.

Some embodiments may not support context-based delivery, or may implement context-based delivery via other components of the notification system. In the latter case, client application 900 may not include a context manager, but instead may relay current context parameters to the component(s) that implement the context-based preferences (e.g., by publishing its current context to an exchange point) such as noted above with regard to FIG. 7.

Figure 10:
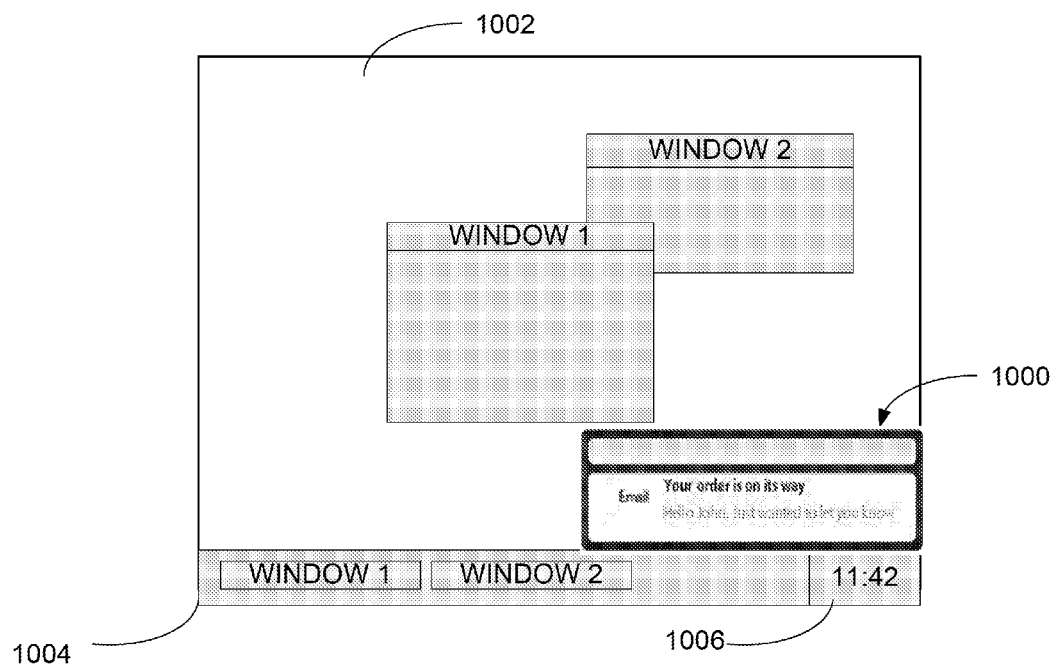
FIGS. 10-12 are each a diagram illustrating an example of outputting a notification.

FIG. 10 illustrates an example 1000 of a visual notification from a publisher client that corresponds to an online bookseller. In this example, the notification is rendered as a small popup relative to a display screen 1002 of a subscriber client. In this generalized example, the display has rendered windows 1 and 2 along with a task or menu bar 1004 and system tray 1006 (currently showing only the local time). Notification 1000 occupies a relatively large area of display 1002 and likely will catch the user's attention. As another example, a notification may be rendered as an icon in the taskbar. Regardless of size, a notification may feature animation, flashing, color, etc. The icon could be clickable to open a larger view of the notification or the client interface for the notifier application or service.

A notifier may support additional views. For example, in some embodiments, a notifier supports a "log" view where notifications are listed. For example, a log view may list notifications by date, sender, publisher, type, time received, etc. A user may be able to select a notification from the log view in order to display the full notification or take other action. However, unless the user is actively reviewing the log, it is unlikely for the user to notice a notification appearing in the log view.

Figure 11:
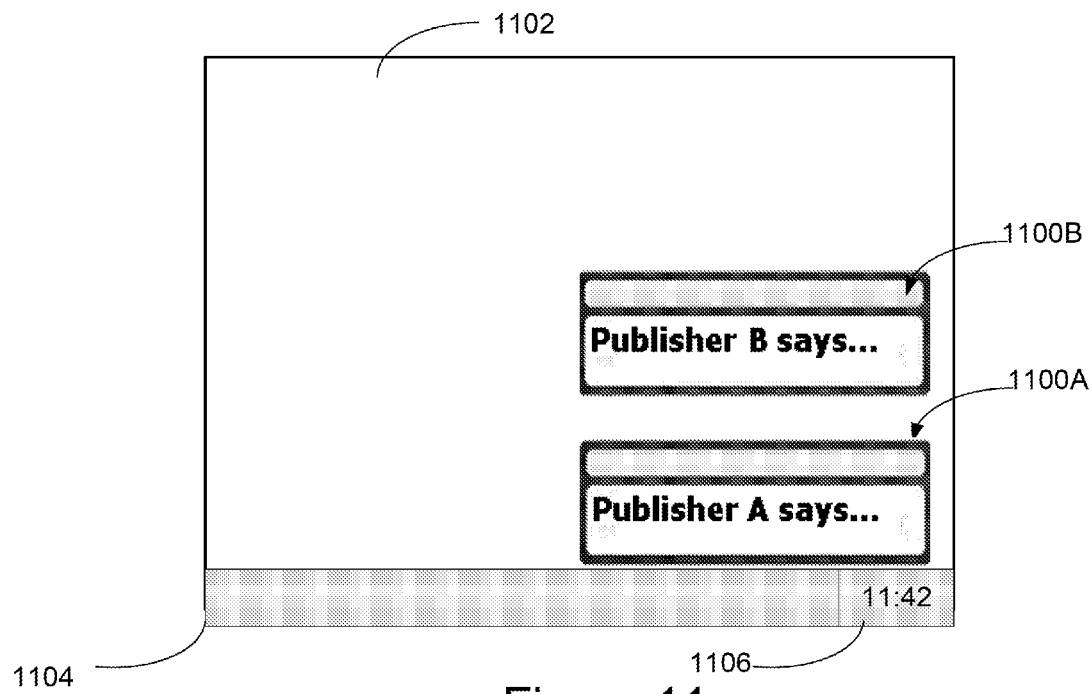
Figure 12:
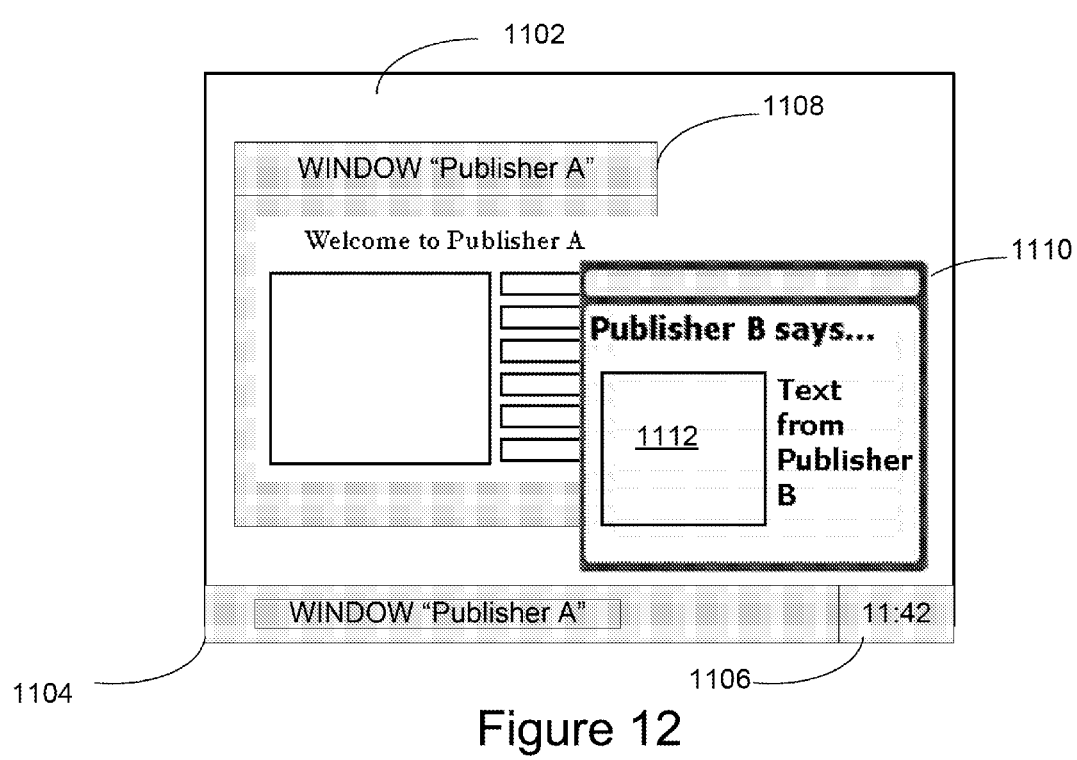

FIGS. 11-12 illustrate an example 1100 of a notification delivery. In this example, two notifications are rendered as small popups relative to a display screen 1102 of a subscriber client. In this generalized example, the display has rendered a task or menu bar 1104 and system tray 1006 (currently showing only the local time). Notification 1100A from publisher "A" is displayed along with notification 1100B from publisher "B." For instance, notifications 1100A and 1100B may have been specified as part of respective streams of notification data published to the same exchange point accessed by the client or to separate exchange points simultaneously listened to by the client.

FIG. 12 illustrates the result of user interaction with notifications 1100A and 1100B. In this example, in response to clicking on notification 1100A (or another suitable input event), the client application has launched an application resulting in window 1108. For example, window 1108 may be provided by a web browser directed to a web site provided by or specified by publisher A. Thus, even though notifications provided by publisher A are provided alongside notifications from other publishers (e.g., publisher B), publisher A can redirect users to its exclusive web real estate. Another application (e.g., a music player or store application, photo sharing application, content aggregator) may be launched in addition to or instead of a browser.

Interface 1110 has been provided via data included in the notification stream that included notification 1110B from publisher B. For example, the notification stream may comprise binary data, such as multimedia data (e.g. text, images, video, audio, etc.) used to render interface 1110. However, in some embodiments, the stream of notification data includes a mechanism by which the user can interact with the publisher directly inside the notification popup. For example, the notification data stream may comprise multimedia instructions playable by a multimedia player (such as the ADOBE® FLASH® player). Thus, area 1112 may include streaming video and/or interactive controls.

Additional exemplary aspects and features of notification delivery systems can be found in co-pending U.S. patent application Ser. No. 12/108,892, filed Apr. 24, 2008 and entitled "Systems and Methods for Collecting and Distributing a Plurality of Notifications" and U.S. patent application Ser. No. 12/250,912, filed Oct. 14, 2008 and entitled "Systems and Methods for Prioritizing Notifications," by John Shapiro, both of which are incorporated by reference herein in their entireties.

As mentioned above, contextual data may comprise the frequency of notifications from a particular exchange point or publisher and/or other feedback regarding notifications (such as actions taken in the past upon receipt of certain notifications). For example, different kinds of actions taken based on past notifications associated with an exchange point may be tracked and maintained as a contextual value. For example, if a user "swipes away" the window/popup containing notification data; this action may indicate disapproval. The user may "pin" the notification indicating the user will return to it later; this action may indicate neither disapproval or approval. The user may click on or otherwise actively interact with the notification; this action may indicate favorable treatment.

A contextual value for an exchange point may based on the frequency of previous "disapproving" and "favorable" treatments, and one or more contextual delivery parameters may specify that access is desired only for notification streams associated with those exchange points whose previous notifications met a threshold level of favorable treatment. As noted above, this contextual delivery parameter may be combined with one or more other rules—for instance, the user may request "favored" notification data during certain parts of the day and "any" notification data at a different part of the day.

Application Ser. No. 12/250,912 includes examples in which notifications are scored based on user action (and/or inaction) at notification delivery, with future notification output characteristics selected based at least in part on the score. Such scores could be used for contextual delivery purposes—for example, scores of notifications associated with particular exchange points could be used to generate a score for the exchange point to indicate favorable or unfavorable treatment of notifications from the exchange point. The exchange point score could then be considered as a current contextual value, with only those notifications from an exchange point with a sufficiently high (or low) score delivered. Of course, any suitable method of assessing treatment of notifications may be used, and treatment may be classified in any suitable manner beyond simply "favorable" and "unfavorable."

Some examples above referred to a persistent connection between a notification relay service and a client, such as a persistent TCP connection between a notification relay server computing platform and a client device. However, in some instances, the notification relay service can connect to a proxy of a client. For example, a notification system client may be behind a firewall that prohibits persistent connections. As another example, the notification may be intended for delivery to a device that does not support a persistent connection method available to the notification relay service.

In some embodiments, the notification relay service maintains a persistent connection to a gateway. A gateway can comprise a computing platform that supports a persistent connection to the notification relay service and one or more connections to another device (end-user device) that receives the notification from the gateway and provides output in one or more formats for an end user.

For example, a gateway may comprise a processor with access to computer-readable media and operative to receive notifications from the notification relay service, reformat the notifications, and provide the notifications via a connection to the device that receives the notification. As an example, a gateway may receive a stream of notifications via RTMP over a persistent TCP connection and then forward the notifications to a mobile device via SMS (short message service) protocol. As another example, a gateway may receive audio-format notifications via a persistent TCP connection, establish a telephone-based link to a user, and play back the audio notification. Notification streams could be published in an analogous fashion, with the gateway configured to translate notification data sent via a first protocol (such as SMS) into a suitable format for streaming via the notification relay service.

Some portions of the detailed description above were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps beyond those explicitly recited. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method comprising:
    accessing, by a computing system, data representing a first contextual value for a notification client;
    determining, by the computing system, that the first contextual value for the notification client corresponds to a second contextual value for at least one exchange point of a plurality of exchange points, wherein each of the plurality of exchange points comprises a logical grouping of notifications, wherein each of the plurality of exchange points is accessible by a plurality of clients for publishing or listening to the notifications;
    establishing, by the computing system, a persistent connection between the notification client and the at least one exchange point based on the first contextual value corresponding to the second contextual value, wherein the persistent connection is configured to provide access to streams of notification data associated with the at least one exchange point; and
    terminating, by the computing system, the persistent connection between the notification client and the at least one exchange point in response to at least one of the first contextual value and the second contextual value being modified such that the first contextual value does not correspond to the second contextual value.

2. The method of claim 1, wherein the first contextual value for the notification client comprises a geographical limitation and the second contextual value for the at least one exchange point comprises an association between a geographic location and the at least one exchange point.

3. The method of claim 2, wherein the geographical limitation is specified as relative to a current geographic location of a client device associated with the notification client.

4. The method of claim 2, wherein determining that the first contextual value corresponds to the second contextual value comprises determining that the geographic location has a set of coordinates satisfying the geographical limitation.

5. The method of claim 1,
    wherein the first contextual value for the notification client comprises a proximity limitation based on a first geographic location of a client device associated with the notification client and the second contextual value for the at least one exchange point comprises an association between a second geographic location of the at least one exchange point; and
    wherein determining that the first contextual value corresponds to the second contextual value comprises determining that the first geographic location is in a proximity to the second geographic location such that the proximity limitation is satisfied.

6. The method set forth in claim 5, wherein determining that the first contextual value corresponds to the second contextual value comprises determining that a velocity of the client device during movement of the client device has a maximum or minimum velocity.

7. The method set forth in claim 5,
wherein the first contextual value for the notification client further comprises a directional limitation specifying a required direction of movement or a required range of directions of movement, and
wherein determining that the first contextual value corresponds to the second contextual value comprises determining that the client device has a direction of movement relative to the second geographic location of the at least one exchange point such that the directional limitation is satisfied.

8. The method set forth in claim 1,
wherein the first contextual value for the notification client comprises data indicating a level of past treatment by the notification client of previous notifications associated with the at least one exchange point;
wherein the second contextual value comprises a threshold level of past treatment by the notification client of previous notifications associated with the at least one exchange point; and
wherein determining that the first contextual value for the notification client corresponds to the second contextual value comprises determining that the past treatment of the previous notifications satisfies the threshold level of past treatment.

9. The method of claim 1, further comprising outputting, by the computing system, a notification based on a stream of notification data received from the at least one exchange point, wherein outputting the notification comprises outputting at least one of a visual or audio alert.

10. A non-transitory computer-readable medium tangibly embodying program code executable by a computing system, the program code comprising:
program code for accessing data representing a first contextual value for a notification client;
program code for determining that the first contextual value for the notification client corresponds to a second contextual value for at least one exchange point of a plurality of exchange points, wherein each of the plurality of exchange points comprises a logical grouping of notifications, wherein each of the plurality of exchange points is accessible by a plurality of clients for publishing or listening to the notifications; and
program code for providing a persistent connection between the notification client and the at least one exchange point, wherein the persistent connection is configured to provide access to streams of notification data associated with the at least one exchange point;
wherein determining that the first contextual value corresponds to the second contextual value comprises at least one of:
determining that the first contextual value comprising a direction of movement relative to the at least one exchange point by a client device associated with the notification client satisfies the second contextual value comprising a required direction of movement or a required range of directions of movement; or
determining that the first contextual value comprising a past treatment of the previous notifications satisfies the second contextual value comprising a threshold level of past treatment of previous notifications associated with the at least one exchange point.

11. The non-transitory computer-readable medium of claim 10, further comprising:
program code for receiving a stream of notification data associated with the at least one exchange point;
program code for outputting a notification based on the stream of notification data, wherein outputting the notification comprises outputting at least one of a visual or audio alert.

12. A non-transitory computer-readable medium embodying program components executable by a processor to provide a notification client, the program components comprising:
an interface module configured to establish a connection to a notification relay service;
an access manager module configured to identify a plurality of exchange points for which the notification client has listening or publishing permission, wherein each of the plurality of exchange points comprises a logical grouping of notifications, wherein each of the plurality of exchange points is accessible by a plurality of clients for publishing or listening to the notifications;
a context manager module configured to:
access data representing a first contextual value for the notification client; and
determine that the first contextual value for the notification client corresponds to a second contextual value for at least one exchange point; and
a notification request module configured to request a persistent connection between the notification client and the at least one exchange point based on the first contextual value corresponding to the second contextual value, wherein the persistent connection is configured to provide access to streams of notification data associated with the at least one exchange point, wherein the persistent connection is terminated based on at least one of the first contextual value and the second contextual value being modified such that the first contextual value does not correspond to the second contextual value.

13. The non-transitory computer-readable medium of claim 12, wherein the interface module is configured to identify the second contextual value for the at least one exchange point from a stream of notification data received from the notification relay service and published to other exchange points.

14. The non-transitory computer-readable medium of claim 12,
further comprising program code for determining a first geographic location of the notification client;
wherein the first contextual value for the notification client comprises a geographical limitation and the second contextual value for the at least one exchange point comprises an association between a second geographic location and the at least one exchange point; and
wherein determining that the first contextual value corresponds to the second contextual value comprises determining that the second geographic location has a set of coordinates satisfying the geographical limitation.

15. The non-transitory computer-readable medium of claim 14, wherein the geographical limitation is specified as the first geographic location of the notification client relative to the second geographic location associated the at least one exchange point.

16. The non-transitory computer-readable medium of claim 14, wherein the context manager module is configured to determine that the first contextual value for the notification client corresponds to the second contextual value for the at least one exchange point by determining that a current geographical location of the notification client is within a radius of a geographical location associated with the at least one exchange point.

17. The non-transitory computer-readable medium of claim 14, wherein determining that the first contextual value corresponds to the second contextual value comprises determining that a velocity of a client device associated with the notification client during movement of the client device has a maximum or minimum velocity.

18. A notification server comprising:
a processor;
a non-transitory computer-readable medium accessible by the processor;
wherein the processor is configured to execute program components embodied in the non-transitory computer-readable medium, wherein executing the program components causes the notification server to perform acts comprising:
determining a plurality of exchange points for which a notification client has listening or publishing permission, wherein each of the plurality of exchange points comprises a logical grouping of notifications, wherein each of the plurality of exchange points is accessible by a plurality of clients for publishing or listening to the notifications;
accessing data representing a first contextual value for the notification client;
determining that the first contextual value for the notification client corresponds to a second contextual value for at least one exchange point of the plurality of exchange points;
establishing a persistent connection between the notification client and the at least one exchange point based on the first contextual value corresponding to the second contextual value, wherein the persistent connection is configured to provide access to streams of notification data associated with the at least one exchange point; and
terminating the persistent connection between the notification client and the at least one exchange point in response to at least one of the first contextual value and the second contextual value being modified such that the first contextual value does not correspond to the second contextual value.

19. The notification server set forth in claim 18, wherein executing the program components causes the notification server to perform additional acts comprising:
updating data in a connectivity descriptor indicating that a subset of the plurality of exchange points satisfies a contextual delivery or publication preference.

20. The notification server set forth in claim 18, wherein the program components cause the notification server to establish the persistent connection between the notification client and the at least one exchange point by pushing at least one stream of notification data to the notification client, the at least one stream of notification data associated with the at least one exchange point.

* * * * *